US009838692B2

(12) United States Patent
Zhou et al.

(10) Patent No.: US 9,838,692 B2
(45) Date of Patent: Dec. 5, 2017

(54) DETECTING AVAILABILITIES OF NEIGHBORING VIDEO UNITS FOR VIDEO CODING

(75) Inventors: Bo Zhou, San Diego, CA (US); Gurunath Ramaswamy, San Diego, CA (US); Karthic Veera, San Diego, CA (US); Peisong Chen, San Diego, CA (US); Muhammed Zeyd Coban, Carlsbad, CA (US); Junchen Du, San Diego, CA (US); Suhail Jalil, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 13/418,107

(22) Filed: Mar. 12, 2012

(65) Prior Publication Data

US 2013/0094580 A1 Apr. 18, 2013

Related U.S. Application Data

(60) Provisional application No. 61/548,630, filed on Oct. 18, 2011.

(51) Int. Cl.
*H04N 19/13* (2014.01)
*H04N 19/96* (2014.01)
(Continued)

(52) U.S. Cl.
CPC ........... *H04N 19/13* (2014.11); *H04N 19/192* (2014.11); *H04N 19/423* (2014.11); *H04N 19/91* (2014.11); *H04N 19/96* (2014.11)

(58) Field of Classification Search
CPC ..................... H04N 19/176; H04N 19/13
See application file for complete search history.

(56) References Cited

U.S. PATENT DOCUMENTS 5,381,274 A 1/1995 Ueda
2008/0130745 A1 6/2008 Pandit et al.
(Continued)

FOREIGN PATENT DOCUMENTS

CN 101605255 A 12/2009
JP H05274841 A 10/1993
(Continued)

OTHER PUBLICATIONS

McCann et al., "HM3: High Efficiency Video Coding (HEVC) Test Model 3 Encoder Description," Joint Collaborative Team on Video Coding (JCT-VC) of ITU-T SG16 WP3 and ISO/IEC JTC1/SC29/WG11, Mar. 2011, 35 pp.
(Continued)

*Primary Examiner* — Zhubing Ren

(57) ABSTRACT

As part of a video encoding or decoding operation on video data, a video coder performs a coding operation for a current video unit of the video data. As part of performing the coding operation for the current video unit, the video coder determines the availabilities of one or more video units that neighbor the current video unit. In order to determine the availability of a video unit that neighbors the current video unit, the video coder identifies, based on availabilities of video units that neighbor a parent video unit of the current video unit, an entry in a lookup table. The identified entry indicates the availability of the video unit that neighbors the current video unit. The video coder then performs a coding operation on the current video unit based on whether the video unit that neighbors the current video unit is available.

42 Claims, 19 Drawing Sheets

(51) Int. Cl.
*H04N 19/91* (2014.01)
*H04N 19/192* (2014.01)
*H04N 19/423* (2014.01)

(56) References Cited

U.S. PATENT DOCUMENTS

| | | |
|---|---|---|
| 2008/0232471 A1 | 9/2008 | Mittal et al. |
| 2008/0239995 A1* | 10/2008 | Lee ................ H04L 12/1818 370/260 |
| 2009/0002379 A1 | 1/2009 | Baeza et al. |
| 2009/0003446 A1 | 1/2009 | Wu et al. |
| 2009/0003447 A1 | 1/2009 | Christoffersen et al. |
| 2009/0196342 A1* | 8/2009 | Divorra Escoda et al. .................... 375/240.02 |
| 2010/0080285 A1 | 4/2010 | Lee et al. |
| 2010/0098157 A1 | 4/2010 | Yang |
| 2011/0038412 A1 | 2/2011 | Jung et al. |
| 2012/0039383 A1* | 2/2012 | Huang et al. .......... 375/240.02 |

FOREIGN PATENT DOCUMENTS

| | | |
|---|---|---|
| JP | 2013502145 A | 1/2013 |
| WO | 2011019253 A3 | 2/2011 |

OTHER PUBLICATIONS

International Preliminary Report on Patentability—PCT/US2012/055462—International Bureau of WIPO, Geneva, Switzerland, dated Jan. 24, 2014.
Second Written Opinion from International Application No. PCT/US2012/055462, dated Oct. 4, 2013, 9 pp.
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
International Search Report and Written Opinion—PCT/US2012/055462—ISA/EPO—Nov. 23, 2012—13 pp.
International Telecommunication Union, "Advanced video coding for generic audiovisual services," Standardization Sector of ITU, Jun. 2011, 674 pp.
Marpe et al., "Context-Based Adaptive Binary Arithmetic Coding in the H.264/AVC Video Compression Standard", IEEE Transactions on Circuits and Systems for Video Technology, vol. 13, No. 7, Jul. 2003, 17 pp.
McCann et al.,"HM3: High Efficiency Video Coding (HEVC) Test Model 3 Encoder Description", Joint Collaborative Team on Video Coding, JCTVC-E602, Mar. 16-23, 2011, 34 pp.
Reply to Written Opinion dated Nov. 23, 2012, from international application No. PCT/US2012/055462, filed Mar. 4, 2013, 24 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011,193 pp.
Wiegand et al.,"WD1: Working Draft 1 of High-Efficiency Video Coding", Joint Collaborative Team on Video Coding, JCTVC-C403, Oct. 7-15, 2010, 137 pp.
Bross, et al., "Motion Vector Coding Test Report by Fraunhofer HHI", JCT-VC Meeting; MPEG Meeting; Jan. 20-28, 2011; DAEGU; (Joint Collaborative Team on Video Coding of ISO/IEC JTC1/SC29/WG11 and ITU-T SG. 16 ); URL: http://wftp3.itu.int/av-arch/jc tvc-site/, No. JCTVC-D314, Jan. 15, 2011; , XP030008354, ISSN: 0000-0013, 10 pp.
Davies, "BBC's Response to the Call for Proposals on Video Compression Technology", Apr. 15-23, 2010; Joint Collaborative Team on Video Coding (JCT-VC) of ITU-T SG16 WP3 and ISO/IEC JTC1/SC29/WG11, Document: JCTVC-A125, Mar. 19, 2012; 30 pp.

* cited by examiner

|  1 |  2 |  3 |  4 |  5 |  6 |  7 |  8 |
|----|----|----|----|----|----|----|----|
|  9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |

| L | 0 | 1 | 0 | 1 | 0 | 1 | 0 |
| L | 0 | 0 | 0 | 1 | 0 | 0 | 0 |
| L | 0 | 1 | 0 | 1 | 0 | 1 | 0 |
| L | 0 | 0 | 0 | 0 | 0 | 0 | 0 |
| L | 0 | 1 | 0 | 1 | 0 | 1 | 0 |
| L | 0 | 0 | 0 | 1 | 0 | 0 | 0 |
| L | 0 | 1 | 0 | 1 | 0 | 1 | 0 |
| L | 0 | 0 | 0 | 0 | 0 | 0 | 0 |

FIG. 19

| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |

FIG. 20

| AL | A | A | A | A | A | A | A |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |
| L | 1 | 1 | 1 | 1 | 1 | 1 | 1 |

FIG. 21

| A | A | A | A | A | A | A | A |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG. 22

| A | A | A | A | A | A | A | AR |
| 1 | 0 | 1 | 0 | 1 | 0 | 1 | 0 |
| 1 | 1 | 1 | 0 | 1 | 1 | 1 | 0 |
| 1 | 0 | 1 | 0 | 1 | 0 | 1 | 0 |
| 1 | 1 | 1 | 1 | 1 | 1 | 1 | 0 |
| 1 | 0 | 1 | 0 | 1 | 0 | 1 | 0 |
| 1 | 1 | 1 | 0 | 1 | 1 | 1 | 0 |
| 1 | 0 | 1 | 0 | 1 | 0 | 1 | 0 |

DETECTING AVAILABILITIES OF NEIGHBORING VIDEO UNITS FOR VIDEO CODING

CROSS REFERENCE TO RELATED APPLICATIONS

This application claims the benefit of U.S. Provisional Application No. 61/548,630, filed Oct. 18, 2011, the entire content of which is hereby incorporated by reference.

TECHNICAL FIELD

The present application relates to the field of video coding, e.g., video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), and extensions of such standards, to transmit and receive digital video information more efficiently. New video coding standards, such as the High Efficiency Video Coding (HEVC) standard being developed by the "Joint Collaborative Team—Video Coding" (JCT-VC), which is a collaboration between MPEG and ITU-T, are being developed. The emerging HEVC standard is sometimes referred to as H.265, although such a designation has not formally been made.

SUMMARY

The techniques of this disclosure generally relate to determining the availabilities of neighboring video units during video coding. More specifically, a video coder performs a video coding operation on a current video unit. As part of performing the video coding operation, in some examples, the video coder may identify an entry in a lookup table based on the availabilities of a parent video unit of a current video unit. The identified entry indicates the availability of a video unit that neighbors the current video unit. In this manner, the lookup table permits the video coder to detect the availability of the video unit that neighbors the current video unit. The video coder performs a coding operation on the current video unit based on the availability of the video unit that neighbors the current video unit.

In one example, this disclosure describes a method for coding video data. The method comprises identifying, based on availabilities of video units that neighbor a parent video unit of a current video unit, an entry in a lookup table. The current video unit is within a picture of the video data. The identified entry indicates an availability of a video unit that neighbors the current video unit. Furthermore, the method comprises performing a coding operation on the current video unit based on whether the video unit that neighbors the current video unit is available.

In another example, this disclosure describes a video coding apparatus comprising one or more processors configured to identify, based on availabilities of video units that neighbor a parent video unit of a current video unit, an entry in a lookup table. The current video unit is within a picture. The identified entry indicates an availability of a video unit that neighbors the current video unit. The one or more processors are further configured to perform a coding operation on the current video unit based on whether the video unit that neighbors the current video unit is available.

In another example, this disclosure describes a video coding apparatus for coding video data. The video coding apparatus comprises means for identifying, based on availabilities of video units that neighbor a parent video unit of a current video unit, an entry in a lookup table. The current video unit is within a picture of the video data. The identified entry indicates an availability of a video unit that neighbors the current video unit. The video coding apparatus further comprises means for performing a coding operation on the current video unit based on whether the video unit that neighbors the current video unit is available.

In another example, this disclosure describes a computer program product comprising a computer-readable medium having stored thereon instructions that, when executed, cause one or more processors to identify, based on availabilities of video units that neighbor a parent video unit of a current video unit, an entry in a lookup table. The current video unit is within a picture. The identified entry indicates an availability of a video unit that neighbors the current video unit. In addition, the instructions, when executed, cause the one or more processor to perform a coding operation on the current video unit based on whether the video unit that neighbors the current video unit is available.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 3 is a conceptual diagram that illustrates an example raster scan order of treeblocks of a picture.

FIG. 18 is a conceptual diagram that illustrates an example lookup table (LUT) for below-left neighbors.

FIG. 19 is a conceptual diagram that illustrates an example LUT for left neighbors.

FIG. 20 is a conceptual diagram that illustrates an example LUT for above-left neighbors.

FIG. 21 is a conceptual diagram that illustrates an example LUT for above neighbors.

FIG. 22 is a conceptual diagram that illustrates an example LUT for above-right neighbors.

DETAILED DESCRIPTION

Figure 1:
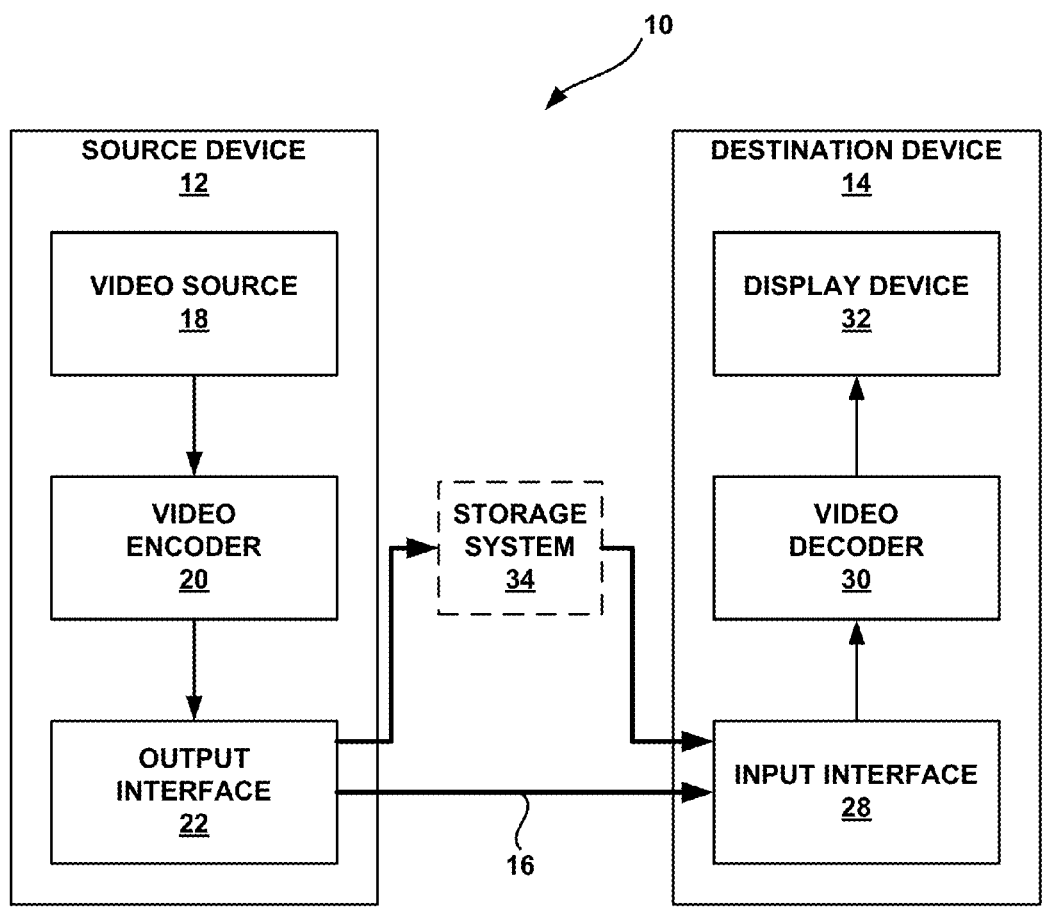
FIG. 1 is a block diagram that illustrates an example video coding system that may utilize techniques of this disclosure.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

The techniques of this disclosure may increase the efficiency with which a video coder may determine the availability of a neighbor of a video unit of a picture. As used described herein, the term "video coder" refers generically to both video encoders and video decoders. In this disclosure, the terms "video coding" or "coding" may refer generically to video encoding and video decoding. A "video unit" may correspond to a contiguous group of pixel values. A first video unit may be a neighbor of a second video unit (i.e., the first video unit neighbors the second video unit), if one or more pixel values of the first video unit are adjacent in a picture to one or more pixel values of the second video unit.

When performing a video coding process on a video unit, a neighboring video unit may be "available" if a video coder is able to use data associated with the neighboring video unit to code the video unit. The neighboring video unit may be "unavailable" if the video coder is unable to use data associated with the neighboring video unit to code the video unit. For example, when a video encoder performs a video encoding process on a video unit, a neighboring video unit may be unavailable if the video encoder has not yet encoded the neighboring video unit, if the neighboring video unit does not exist, if the neighboring video unit is in a different slice than the video unit, or if the video encoder is otherwise unable to use data associated with the neighboring video unit to encode the video unit. When a video decoder performs a video decoding process on a video block, a neighboring video unit may be unavailable if the video decoder has not yet decoded the neighboring video unit, if the neighboring video unit does not exist, if the neighboring video unit is in a different slice than the video unit, or if the video decoder is otherwise unable to use data associated with the neighboring video unit to decode the video unit.

There may be a variety of reasons why a video coder may need to determine whether a neighboring video unit is available, such as for intra-prediction or motion vector prediction. For example, a video encoder or video decoder may need to have access to the pixel values of a neighboring video unit in order to intra predict pixel values of a current video unit. In this example, the video decoder may not be able to access the pixel values of the neighboring video unit if the video decoder has not yet decoded the neighboring video unit. In another example, for motion vector prediction, a video encoder or video decoder may need to have access to motion data for a neighboring video unit in order to generate motion data for a current video unit, e.g., for use in merge or skip modes, or advanced motion vector prediction (AMVP) modes. In other examples, the availability of a neighboring video unit may be needed to determine contexts for entropy coding of various syntax elements. In these examples, the video encoder may not be able to access the motion data for the neighboring video unit if the video encoder has not yet encoded the neighboring video unit.

In accordance with the techniques of this disclosure, a video coder may store a lookup table (LUT) that contains a plurality of entries. The video coder may access a particular entry in the LUT based on the availabilities of video units that neighbor a parent video unit of a current video unit. The entry in the LUT may specify the availabilities of the video units that neighbor the current video unit. In this way, the video coder may use a LUT to determine, based on the availabilities of the video units that neighbor a parent video unit of a current video unit, the availability of a video unit that neighbors the current video unit. Determining the availabilities of neighboring video units in this way may require fewer memory accesses than previously proposed techniques for determining the availabilities of neighboring video units, and may promote relatively quick detection of availability.

FIG. 1 is a block diagram that illustrates an example video coding system 10 that may utilize the techniques described in this disclosure. As shown in the example of FIG. 1, video coding system 10 includes a source device 12 and a destination device 14. Source device 12 generates encoded video data. Destination device 14 may decode the encoded video data at a later time. Source device 12 and destination device 14 may comprise any of a wide range of devices, including desktop computers, notebook (i.e., laptop) computers, tablet computers, set-top boxes, mobile telephones, telephone handsets, "smart" pads, televisions, cameras, display devices, digital media players, video gaming consoles, video streaming devices, in-vehicle computers, or other types of computing devices capable of encoding and decoding video data.

Destination device 14 may receive the encoded video data via a communication channel 16. Communication channel 16 may comprise a medium or device capable of moving the encoded video data from source device 12 to destination device 14. In one example, communication channel 16 may comprise a communication medium that enables source device 12 to transmit encoded video data directly to destination device 14 in real-time. Source device 12 or another device may modulate the encoded video data according to a communication standard, such as a wireless communication protocol. The communication medium may comprise any wireless or wired communication medium, such as a radio frequency (RF) spectrum or one or more physical transmission lines. Communication channel 16 may form part of a packet-based network, such as a local area network, a wide-area network, or a global network such as the Internet. Communication channel 16 may include routers, switches, base stations, or any other equipment that may be useful to facilitate communication of the encoded video data from source device 12 to destination device 14.

In some examples, source device 12 and destination device 14 may be equipped for wireless communication. However, the techniques of this disclosure are not necessarily limited to wireless applications or settings. Rather, the techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, source device 12 and destination device 14 may be configured to support one-way or two-way video transmission to support applications such as video streaming, video playback, video broadcasting, and/or video telephony.

Furthermore, in some examples, source device 12 may output the encoded video data to a storage system 34. Similarly, destination device 14 may access encoded video data stored on storage system 34. In various examples, storage system 34 may include various distributed or locally accessed data storage media. Example types of data storage media include, but are not limited, to hard drives, Blu-ray discs, DVDs, CD-ROMs, solid state memory units, volatile or non-volatile memory, or other digital storage media suitable for storing encoded video data.

In some examples, storage system 34 may comprise a file server or another intermediate storage device that may store the encoded video generated by source device 12. Destination device 14 may access stored video data from storage system 34 via streaming or download. The file server may be any type of server capable of storing encoded video data and transmitting that encoded video data to destination device 14. Example file servers include a web server (e.g., for a website), a File Transfer Protocol (FTP) server, a network attached storage (NAS) device, or a local disk drive. Destination device 14 may access the encoded video data through a data connection, such as an Internet connection. The data connection may include a wireless channel (e.g., a Wi-Fi connection), a wired connection (e.g., DSL, cable modem, etc.), or a combination of both that is suitable for accessing encoded video data stored on a file server. The transmission of encoded video data from storage system 34 may be a streaming transmission, a download transmission, or a combination of both.

In the example of FIG. 1, source device 12 includes a video source 18, a video encoder 20 and an output interface 22. In some examples, output interface 22 may also include a modulator/demodulator (modem) and/or a transmitter. Video source 18 may provide video data to video encoder 20. In various examples, video source 18 may comprise various types of devices and/or systems for providing video data. For example, video source 18 may comprise a video capture device, such as a video camera. In another example, video source 18 may comprise a video archive that contains previously captured video. In yet another example, video source 18 may comprise a video feed interface that receives video from a video content provider. In yet another example, video source 18 may comprise a computer graphics system for generating computer graphics data.

As described in detail below, video encoder 20 may encode the video data provided by video source 18. In some examples, source device 12 may transmit the encoded video data directly to destination device 14 via output interface 22. Moreover, in some examples, storage system 34 may store the encoded video data for later access by destination device 14 or other devices.

This disclosure may generally refer to video encoder 20 as "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage system 34) prior to being received and decoded by video decoder 30. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium at the time of encoding, which a decoding device may then retrieve at any time after being stored to this medium.

In the example of FIG. 1, destination device 14 includes an input interface 28, a video decoder 30, and a display device 32. In some examples, input interface 28 may include a receiver and/or a modem. Input interface 28 of destination device 14 receives encoded video data from communication channel 16 and/or storage system 34. Video decoder 30 decodes the encoded video data received by input interface 28. Destination device 14 may render the decoded video data for display on display device 32.

Display device 32 may be integrated with or may be external to destination device 14. In some examples, destination device 14 may include an integrated display device and may also be configured to interface with an external display device. In various examples, display device 32 may comprise various types of display devices. For example, display device 32 may comprise a liquid crystal display (LCD), a plasma display, an organic light emitting diode (OLED) display, or another type of display device.

Although not shown in FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and use one or more processors to execute the instructions in hardware in order to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video compression standard, such as the High Efficiency Video Coding (HEVC) standard presently under development and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Example extensions to standards include the scalable video coding (SVC) and Multiview Video Coding (MVC) extensions to the H.264/AVC standard. The techniques of this disclosure are not limited to any particular coding standard. Other examples of video compression standards include MPEG-2 and ITU-T H.263.

As mentioned briefly above, video encoder 20 encodes video data. The video data may comprise one or more sequences of pictures. Each of the pictures is a still image. In some instances, a picture may be referred to as a "frame." When video encoder 20 encodes the video data, video encoder 20 may generate a bitstream. The bitstream includes a sequence of bits that form a representation of coded pictures and associated data. A coded picture is a coded representation of a picture.

To generate the bitstream, video encoder 20 may perform an encoding operation for sequences of pictures in the video data. When video encoder 20 performs the encoding operation for a sequence of pictures, video encoder 20 may generate a series of coded pictures and associated data. In addition, video encoder 20 may generate a sequence parameter set (SPS) that contains parameters applicable to the sequence of pictures. Furthermore, video encoder 20 may generate picture parameter sets (PPSs) that contain parameters applicable to the pictures as a whole.

To generate a coded picture, video encoder 20 may partition a picture into one or more treeblocks. A treeblock is a 2D block of video data. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs).

Figure 2:
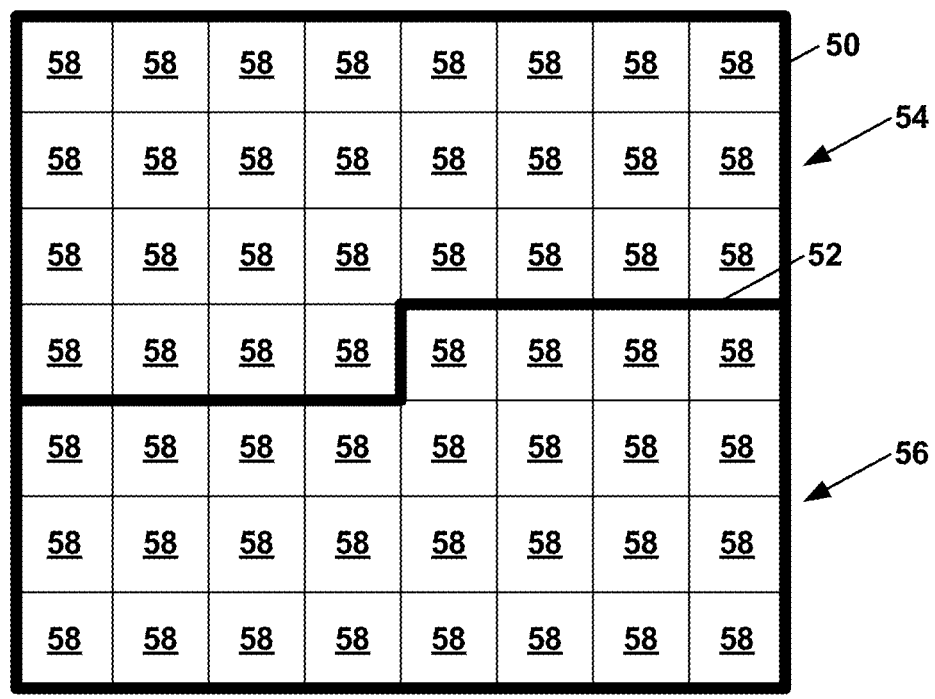
FIG. 2 is a conceptual diagram that illustrates an example partitioning of a picture into treeblocks and slices.

In some examples, video encoder 20 may partition a picture into a plurality of slices. Each of the slices may include an integer number of CUs. In some instances, a slice comprises an integer number of treeblocks. In other instances, a boundary of a slice may be within a treeblock. If the boundary of a slice is within a treeblock, the slice may be referred to as a fine granular slice. FIG. 2 illustrates a picture 50 partitioned into LCUs. The darker line 52 near the horizontal midpoint of picture 50 indicates a boundary between a slice 54 and a slice 56 of picture 50. In the example of FIG. 2, cells 58 within picture 50 may correspond to treeblocks.

As part of performing an encoding operation for a picture, video encoder 20 may perform encoding operations for each slice of the picture. The encoding operation for a slice may generate encoded data associated with the slice. The encoded data associated with the slice may be referred to as a "coded slice." The coded slice may include a slice header and slice data. The slice data may include a series of successive coding units in coding order. The slice header may contain data elements pertaining to the first or all treeblocks of the slice.

To generate the coded slice data for a slice, video encoder 20 may perform encoding operations on each treeblock in the slice. Video encoder 20 may perform the encoding operations on the treeblocks in the slice according to a raster scan order. FIG. 3 is a conceptual diagram that shows an example raster scan order of the treeblocks of picture 50, where the number in each treeblock indicates an example order of the raster scanning of the treeblock (e.g., 1 to 56 in the example of FIG. 3). When video encoder 20 performs the encoding operation on a treeblock, video encoder 20 may generate a coded treeblock. The coded treeblock may comprise data representing an encoded version of the treeblock.

To generate the coded treeblock, video encoder 20 may recursively perform quadtree partitioning on the treeblock to divide the treeblock into progressively smaller CUs. For example, video encoder 20 may partition a treeblock into four equally-sized sub-CUs, partition one or more of the sub-CUs into four equally-sized sub-sub-CUs, and so on. One or more syntax elements in the bitstream may indicate a maximum number of times video encoder 20 may partition a treeblock. The syntax elements may also indicate a smallest coding unit (SCU). In some examples, a CU may be square in shape. In other examples, a CU may be rectangular or have another shape. The parent video unit of a given current video unit may correspond to the quadtree node immediately above the quadtree node that corresponds to the current video unit. When video encoder 20 uses quadtree partitioning to partition a given video unit into four equally-sized video units, the given video unit is said, in this disclosure, to be the parent video unit of the four equally-sized video units.

Figure 4:
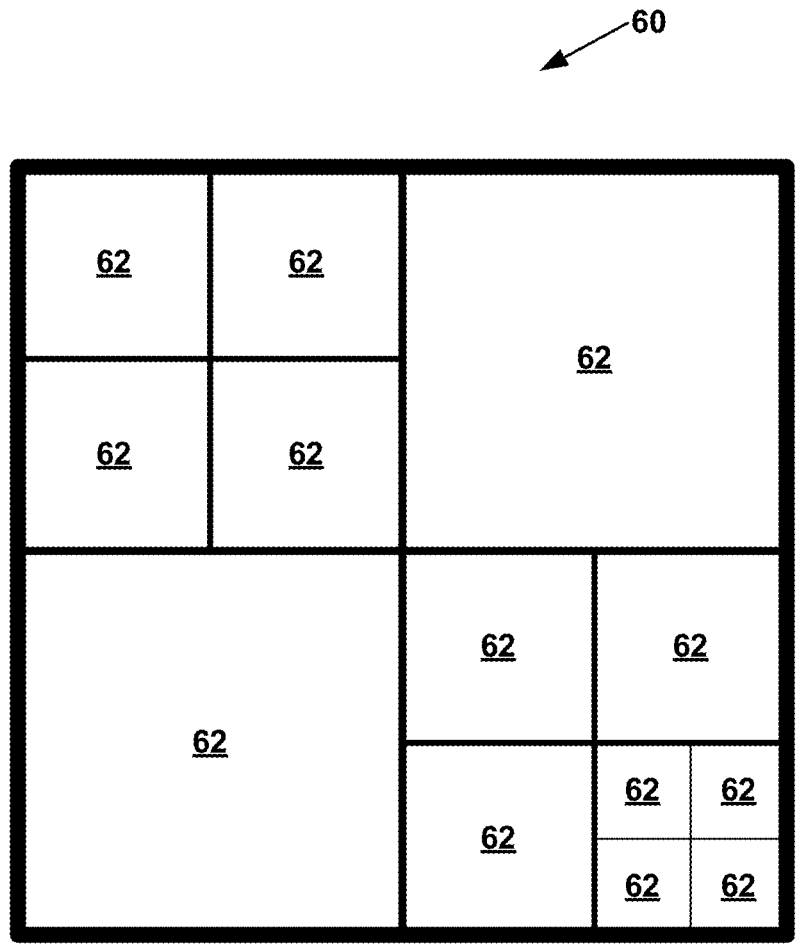
FIG. 4 is a conceptual diagram that illustrates an example treeblock partitioned into progressively smaller video coding units.

FIG. 4 is a conceptual diagram that illustrates a treeblock 60 partitioned into progressively smaller CUs. In the example of FIG. 4, treeblock 60 is partitioned into thirteen non-partitioned CUs 62. In other examples, video encoder 20 may partition treeblocks in other ways.

As part of performing the encoding operation for a treeblock, video encoder 20 may generate a hierarchical quadtree data structure for the treeblock. For example, a treeblock may correspond to a root node of the quadtree data structure. If video encoder 20 partitions the treeblock into four sub-CUs, the root node has four child nodes in the quadtree data structure. Each of the child nodes corresponds to one of the sub-CUs. If video encoder 20 partitions one of the sub-CUs into four sub-sub-CUs, the node corresponding to the sub-CU may have four child nodes, each of which corresponds to one of the sub-sub-CUs. Each node of the quadtree data structure may provide syntax data for the corresponding CU. For example, a node in the quadtree may include a split flag, that indicates whether the CU corresponding to the node is partitioned (i.e., split) into four sub-CUs. Syntax elements for a CU may be defined recursively, and may depend on whether the CU is split into sub-CUs. A CU that is not partitioned may correspond to a leaf node in the quadtree data structure. A leaf node in the quadtree data structure may be referred to as a "coding node." The data representing the encoded version of the treeblock may include data based on the quadtree data structure for the treeblock.

Figure 5:
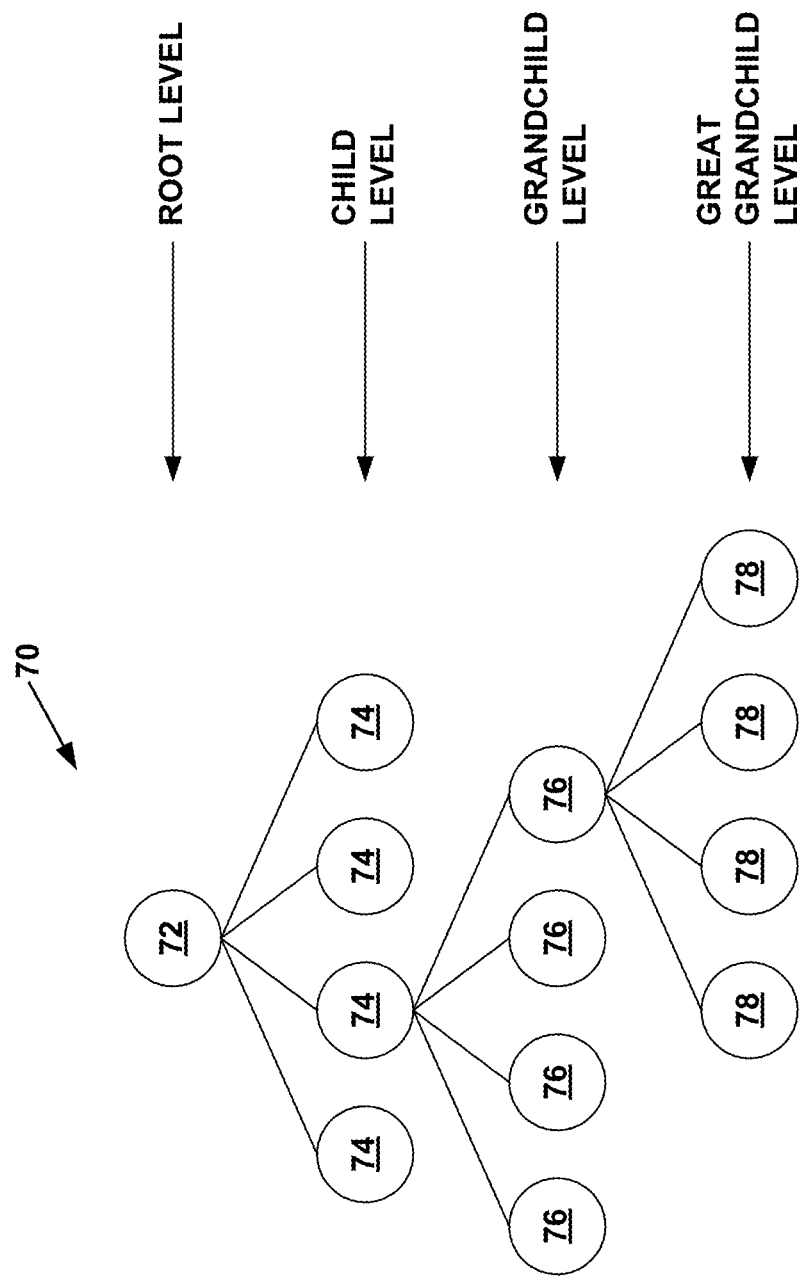
FIG. 5 is a conceptual diagram that illustrates an example quadtree data structure for partitioning a treeblock.

FIG. 5 is a conceptual diagram that illustrates an example quadtree data structure 70 for partitioning a treeblock. Quadtree data structure 70 in the example of FIG. 5 does not correspond to the partitions of treeblock 60 in FIG. 4. In the example of FIG. 5, quadtree data structure 70 includes a root node 72 that corresponds to a treeblock. Video encoder 20 partitions the treeblock into four sub-CUs. These sub-CUs correspond to nodes 74 in a child level of quadtree data structure 70. Furthermore, in the example of FIG. 5, video encoder 20 has partitioned the second sub-CU into four sub-sub-CUs. These sub-sub-CUs correspond to nodes 76 in the grandchild level of quadtree data structure 70. In FIG. 5, video encoder 20 has partitioned the fourth sub-sub-CU into four sub-sub-sub-CUs. These sub-sub-sub-CUs correspond to nodes 78 in the great-grandchild level of quadtree data structure 70.

Figure 6:
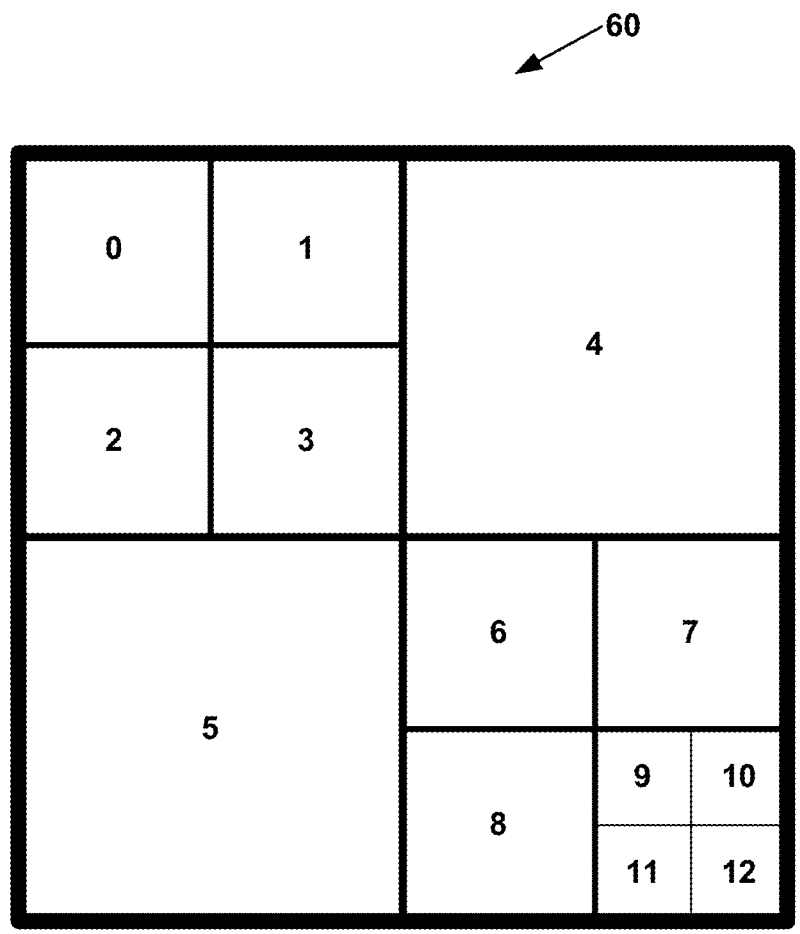
FIG. 6 is a conceptual diagram that illustrates an example sequencing of non-partitioned coding units of a treeblock according to a z-scan order.

When video encoder 20 performs an encoding operation on a treeblock, video encoder 20 may determine a sequence of the CUs of the treeblock at each level within the quadtree of the treeblock according to a z-scan order. For example, video encoder 20 may sequence sub-CUs at the child level according to the z-scan order, sequence sub-sub-CUs of a first sub-CU according to the z-scan order, sequence sub-sub-CUs of a second sub-CU according to the z-scan order, sequence sub-sub-sub-CUs of a sub-sub-CU according to the z-scan order, and so on. Video encoder 20 may then perform encoding operations on each CU of the treeblock based on the determined sequence of CUs. FIG. 6 is a conceptual diagram that illustrates an example sequencing of the non-partitioned CUs of treeblock 60 according to the z-scan order. In particular, the number within each CU indicates the order in which the CU is scanned relative to the other CU's (e.g., from 0 to 12 in the example of FIG. 6).

As part of performing an encoding operation on a non-partitioned CU, video encoder 20 may generate prediction data for the CU. Video encoder 20 may use intra prediction or inter prediction to generate the prediction data for the CU. When video encoder 20 uses intra prediction to generate the prediction data for the CU, video encoder 20 may derive the prediction data for the CU from decoded pixel values of the picture that contains the CU. For instance, video encoder 20 may generate prediction data for a current video unit based on one or more pixel values of a video unit that neighbors the current video unit. When video encoder 20 uses inter prediction to generate the prediction data for the CU, video encoder 20 derives the prediction data for the CU from decoded values of reference pictures other than the picture that contains the CU.

After video encoder 20 generates prediction data for a CU, video encoder 20 may generate residual data for the CU. For instance, video encoder 20 may generate, based on the prediction data for the CU, residual data for the CU. The residual data for the CU may indicate differences between pixel values in the prediction data for the CU and the original pixel values of the CU.

Furthermore, as part of performing an encoding operation on a non-partitioned CU, video encoder 20 may perform recursive quadtree partitioning on the CU to partition the CU into one or more transform units (TUs). This disclosure may refer generically to CUs and TUs as "video units." Each TU of a CU may be associated with a different portion of the residual data of the CU. In a similar fashion as video encoder 20 sequences CUs within a treeblock, video encoder 20 may sequence the TUs of a CU according to a z-scan order. Video encoder 20 may perform transform operations for each TU of the CU according to the z-scan order. When video encoder 20 performs the transform operation for a TU, video encoder 20 may generate a transform coefficient block (i.e., a block of transform coefficients) at least in part by applying a transform to residual data associated with the TU. For instance, video encoder 20 may apply one or more transforms to the residual data to generate one or more transform coefficient blocks. The transform coefficient block may be a 2D matrix of coefficients.

After generating a transform coefficient block, video encoder 20 may generate an encoded version of the transform coefficient block by performing quantization and entropy encoding operations on the transform coefficient block. Video encoder 20 may output the encoded version of the transform coefficient block in the bitstream for the video data. In other words, video encoder 20 may output a bitstream that contains encoded data that represent the transform coefficient blocks.

The video decoding process performed by video decoder 30 may be generally reciprocal to the encoding process performed by video encoder 20. For instance, when video decoder 30 receives a bitstream, video decoder 30 may perform decoding operations on each sequence of pictures in the bitstream. As part of performing a decoding operation on a sequence of pictures, video decoder 30 may perform a decoding operation on each picture in the sequence of pictures. As part of performing a decoding operation on a picture, video decoder 30 may perform a decoding operation on each slice of the picture. As part of performing a decoding operation on a slice, video decoder 30 may perform decoding operations on each treeblock in the slice according to a raster scan order. As part of performing a decoding operation on a treeblock, video decoder 30 may perform decoding operations on each CU of the treeblock according to a z-scan order.

In some instances, video decoder 30 may be unable to perform some decoding operations for a video unit (e.g., a CU or a TU) within a treeblock until video decoder 30 has completed the decoding operations for one or more neighboring video units. For instance, video decoder 30 may be unable to perform some decoding operations for the video unit until video decoder 30 has decoded a below-left neighbor video unit, a left neighbor video unit, an above-left neighbor video unit, an above neighbor video unit, and/or an above-right neighbor video unit. A below-left neighbor video unit of a given video unit occurs to the below and left of the given video unit. A left neighbor video unit of a given video unit occurs to the left of the given video unit. An above-left neighbor video unit of a given video unit occurs to the above-left of the given video unit. An above neighbor video unit of a given video unit occurs above the given video unit. An above-right neighbor video unit occurs to the above-right of the given video unit. Because video decoder 30 performs the decoding operations on treeblocks according to a raster scan order and performs decoding operations on CUs and TUs of a treeblock according to a z-scan order, video decoder 30 may not need to determine the availabilities of the right, below-right, or below neighbors of a video unit to perform decoding operations on a video unit.

There may be a variety of reasons why video decoder 30 is unable to perform a decoding operation on a given video unit until one or more neighboring video units are decoded. For example, video encoder 20 may have performed intra prediction to encode the pixel values of a CU. As part of performing intra prediction, video encoder 20 may use pixel values from a neighboring CU to generate the prediction data for the CU. When video decoder 30 performs the decoding operation on the CU, video decoder 30 may determine whether the neighboring CU has been already been decoded. In other words, video decoder 30 may determine whether the neighboring CU is available. If the particular neighboring CU is available, video decoder 30 may use the pixel values from the neighboring CU to generate the prediction data of the CU. However, if the neighboring CU is not available, video decoder 30 does not have access to the pixel values from the neighboring CU. Accordingly, video decoder 30 may use default pixel values instead of using pixel values from the neighboring CU.

In some instances, video encoder 20 may also need to determine whether the neighboring CUs of a CU have been encoded. For example, video encoder 20 may need to determine whether a neighboring CU of a CU has been encoded in order to generate motion vector candidates that indicate the motion vectors for the CU. Video encoder 20 and video decoder 30 may use various algorithms to determine whether the neighboring video units of a given video unit have been encoded or decoded (i.e., whether the neighboring video units are available). These algorithms may be complicated because video units, such as CUs and TUs, can be associated with different levels (or depths) of quadtree data structures. In other words, the neighbor of the video unit may be associated with a different level of a quadtree than the video unit. Thus, there may actually be two video units directly above the given video unit. Some previously-proposed algorithms are complex and may require large numbers of memory accesses. Because processing complex algorithms and performing memory accesses consumes time and electrical energy, it may be undesirable for video encoder 20 or video decoder 30 to perform such complex algorithms.

In some examples, the techniques of this disclosure may reduce the complexity of determining whether the neighboring video units of a video unit have already been encoded or decoded. For ease of explanation, the term "video coder" can be used to refer to either a video encoder or a video decoder. In accordance with the techniques of this disclosure, a video coder uses a lookup table (LUT) to accelerate the detection of the availabilities of a video unit's neighbors. In various examples, the video coder uses different LUTs in different ways to accelerate the detection of the availabilities of a video unit's neighbors. For example, the video coder may use the availabilities of neighbors of a video unit's parent video unit as an index into a LUT that specifies the availabilities of the video unit's neighbors. Otherwise stated, the video coder may determine the availabilities of neighbors of a video unit's sub-units based on the availabilities of the video unit's neighbors.

In this way, a video coder may perform a method for coding video data. In this method, the video coder may identify, based on availabilities of video units that neighbor a parent video unit of a current video unit, an entry in a lookup table. In this method, the current video unit is within a picture of the video data. The identified entry may indicate an availability of a video unit that neighbors the current video unit. The method may also include performing a coding operation on the current video unit based on whether the video unit that neighbors the current video unit is available. The coding operation may be a video encoding operation or a video decoding operation. In some instances, performing the coding operation on the current video unit comprises performing the coding operation on the current video unit based on data associated with the video unit that neighbors the current video unit. A video coder may perform this method during a video encoding or video decoding operation to perform intra prediction, to obtain motion information in merge/skip or AMVP modes, to obtain context information in entropy coding, or to perform other portions of the video encoding or video decoding operation.

Figure 16:
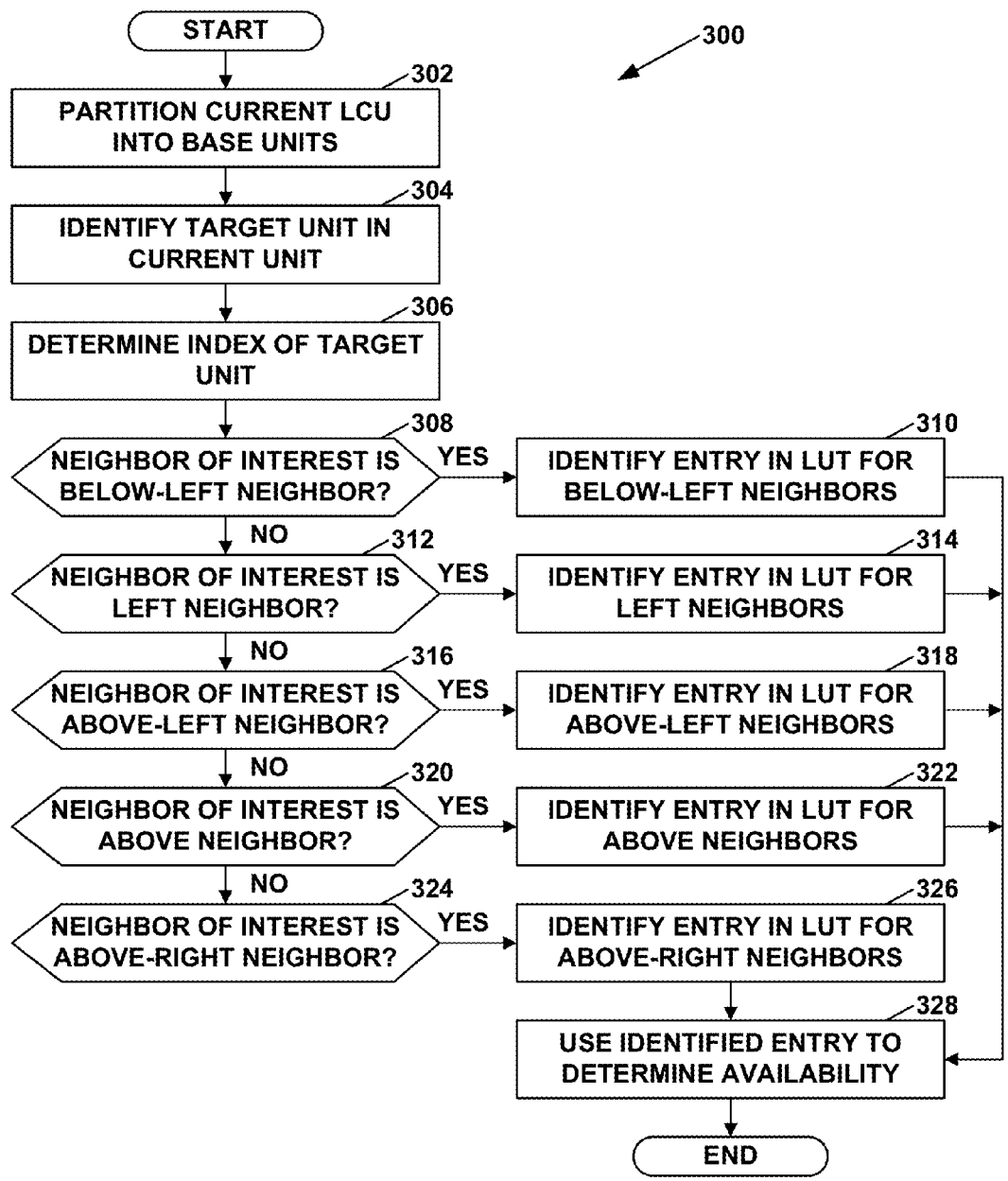
FIG. 16 is a flowchart that illustrates another example operation to determine the availabilities of neighbors of a current video unit.
Figure 23:
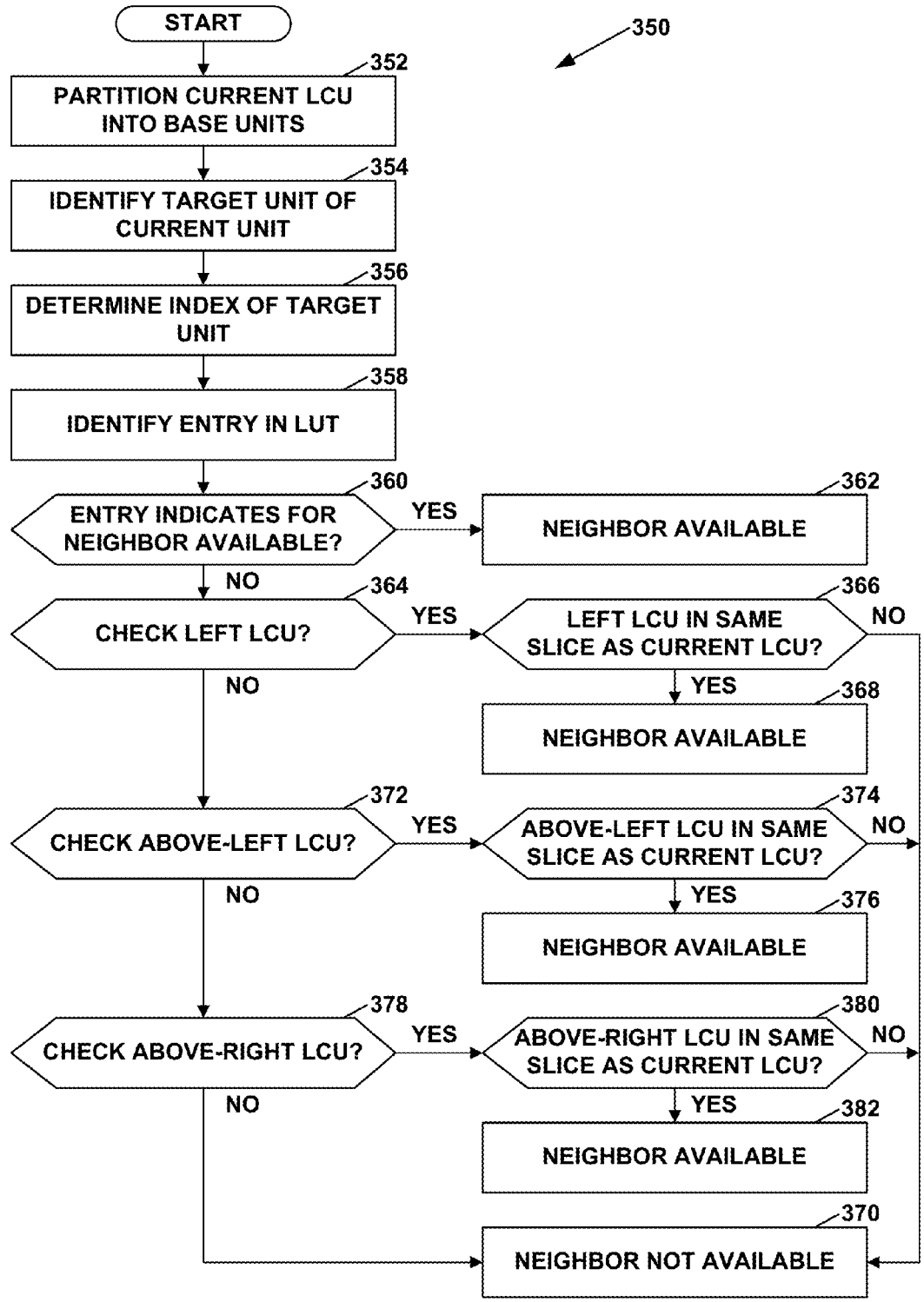
FIG. 23 is a flowchart that illustrates another example operation to determine the availabilities of neighbors of a current video unit.

In other examples, a video coder determines an index of a video unit within a treeblock according to a raster or z-scan order. The video coder may then use this index to identify an entry in an LUT. The video coder may use the identified entry to determine the availabilities of the video unit's neighbors. FIGS. 16 and 23, described in detail below, illustrate example operations to determine the availability of a neighbor in accordance with such examples.

Figure 7:
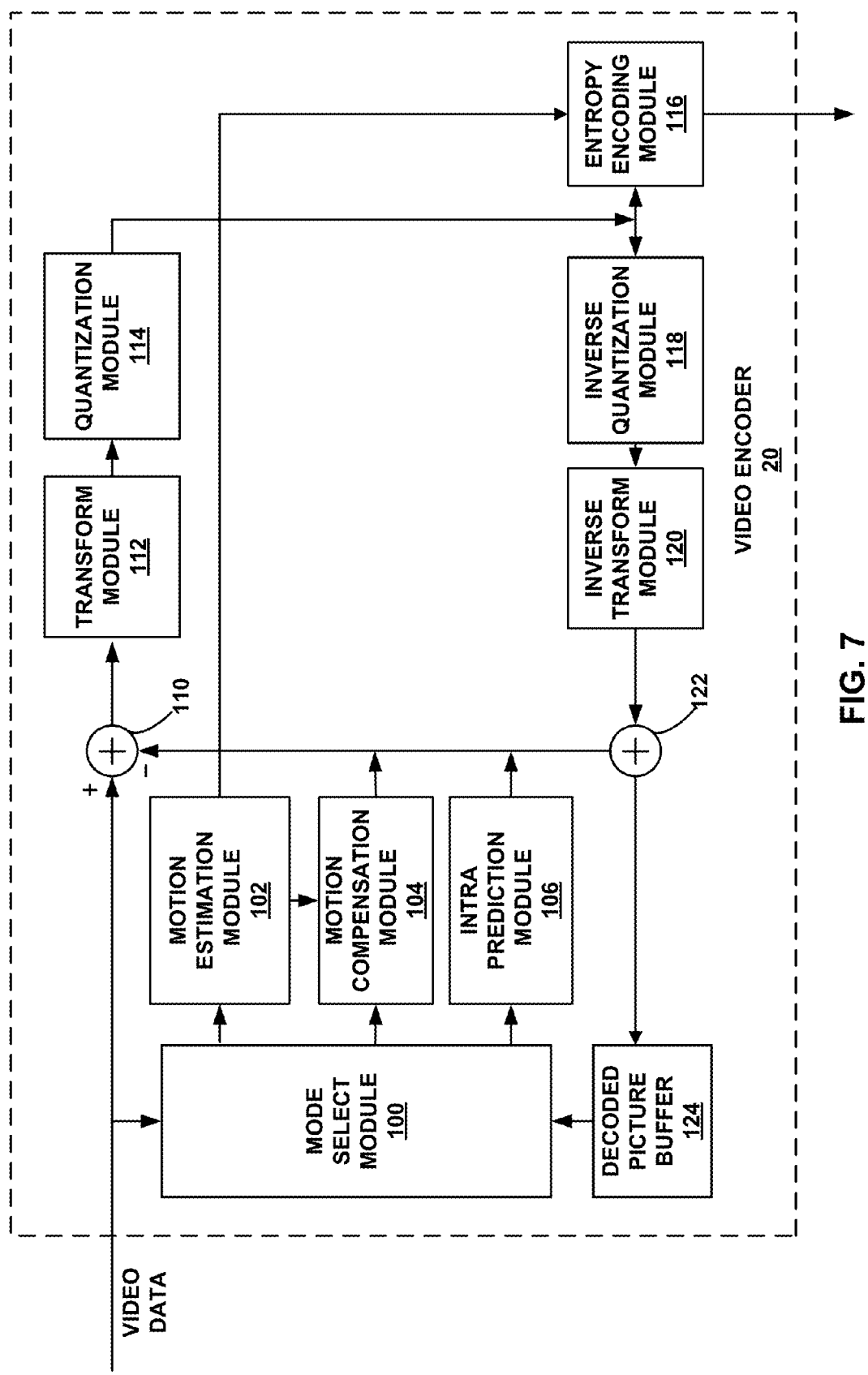
FIG. 7 is a block diagram that illustrates an example of a video encoder that encodes a video sequence.

FIG. 7 is a block diagram that illustrates an example of configuration of video encoder 20 that encodes a video sequence. FIG. 7 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 7, video encoder 20 includes a plurality of functional components. The functional components of video encoder 20 include a mode select module 100, a motion estimation module 102, a motion compensation module 104, an intra prediction module 106, a residual generation module 110, a transform module 112, a quantization module 114, an entropy encoding module 116, an inverse quantization module 118, an inverse transform module 120, a reconstruction module 122, and a decoded picture buffer 124. In other examples, video encoder 20 may include more, fewer, or different functional components. For example, video encoder 20 may include a deblocking filter to filter the output of reconstruction module 122 to remove blockiness artifacts from reconstructed video. Furthermore, motion estimation module 102 and motion compensation module 104 may be highly integrated, but are represented in the example of FIG. 7 separately for purposes of explanation.

Video encoder 20 may receive video data. In various examples, video encoder 20 may receive the video data from various sources. For example, video encoder 20 may receive the video data from video source 18 (FIG. 1) or another source. The video data may represent sequences of pictures. To encode the video data, video encoder 20 may perform an encoding operation on each sequence of pictures. As part of performing the encoding operation on a sequence of pictures, video encoder 20 may perform encoding operations on each picture within the sequence of pictures. As part of performing the encoding operation on a picture, video encoder 20 may perform encoding operations on each slice in the picture. As part of performing the encoding operation on a slice, video encoder 20 may perform an encoding operation on each treeblock in the slice.

As part of performing an encoding operation on a treeblock, video encoder 20 may partition the treeblock into one or more CUs. In some examples, the sizes of the CUs may range from 8×8 pixels up to the size of the treeblock with a maximum of 64×64 pixels or greater. In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. Similar notation may be used to indicate dimensions of transform coefficient blocks.

Video encoder 20 may perform encoding operations on each non-partitioned CU of the treeblock. When video encoder 20 performs the encoding operation on a non-partitioned CU, video encoder 20 generates data representing an encoded version of the non-partitioned CU.

As part of performing the encoding operation for a CU, motion estimation module 102 and motion compensation module 104 perform inter prediction on the CU. In other words, motion estimation module 102 and motion compensation module 104 may generate prediction data for the CU based on decoded pixel values of reference pictures other than the picture that contains the CU. Inter prediction may provide temporal compression.

To perform inter prediction on a CU, video encoder 20 may partition the CU into one or more prediction units (PUs). Video encoder 20 and video decoder 30 may support various PU sizes. Assuming that the size of a particular CU is 2N×2N, video encoder 20 and video decoder 30 may support PU sizes of 2N×2N, N×N, 2N×N, or N×2N. Video encoder 20 and video decoder 30 may also support asymmetric partitioning for PU sizes of 2N×nU, 2N×nD, nL×2N, and nR×2N. In some examples, video encoder 20 may partition a CU into PUs along a boundary that does not meet the sides of the CU at right angles.

Motion estimation module 102 may perform a motion estimation operation with regard to each PU of the CU. When motion estimation module 102 performs a motion estimation operation with regard to a PU, motion estimation module 102 generates one or more motion vectors for the PU. For instance, slices may be I slices, P slices, or B slices. Motion estimation module 102 and motion compensation module 104 may perform different operations for a PU of a CU depending on whether the CU is in an I slice, a P slice, or a B slice. In an I slice, all CUs are intra predicted. Hence, if the CU is in an I slice, motion estimation module 102 and motion compensation module 104 do not perform inter prediction on the CU.

If the CU is in a P slice, the picture containing the CU is associated with a list of reference pictures referred to as "list 0." Each of the reference pictures in list 0 contains pixel values that may be used for inter prediction of subsequent pictures in decoding order. When motion estimation module 102 performs the motion estimation operation with regard to a PU in a P slice, motion estimation module 102 searches the reference pictures in list 0 for a reference sample for the PU. The reference sample of the PU may be a set of pixel values that most closely corresponds to the pixels values of the PU. Motion estimation module 102 may use a variety of metrics to determine how closely a set of pixel values in a reference picture corresponds to the pixel values of a PU. For example, motion estimation module 102 may determine how closely a set of pixel values in a reference picture corresponds to the pixel values of a PU by sum of absolute difference (SAD), sum of square difference (SSD), or other difference metrics.

After identifying a reference sample of a PU of a CU in a P slice, motion estimation module 102 may generate a reference index that indicates the reference picture in list 0 containing the reference sample and a motion vector that indicates a spatial displacement between the PU and the reference sample. In various examples, motion estimation module 102 may generate motion vectors to varying degrees of precision. For example, motion estimation module 102 may generate motion vectors at one-quarter pixel precision, one-eighth pixel precision, or other fractional pixel precision. Motion estimation module 102 may output the reference index and motion vector to entropy encoding module 116 and motion compensation module 104. Motion compensation module 104 may use the reference indexes and motion vectors of PUs of the CU to identify and retrieve the reference samples of the PUs. Motion compensation module 104 may then use pixel values of reference samples of PUs to generate the prediction data for the CU.

If the CU is in a B slice, the picture containing the CU may be associated with two lists of reference pictures, referred to as "list 0" and "list 1." Each of the reference pictures in list 0 contains pixel values that may be used for inter prediction of subsequent pictures in decoding order. The reference pictures in list 1 occur before the picture in decoding order but after the picture in presentation order. In some examples, a picture containing a B slice may be associated with a list combination that is a combination of list 0 and list 1.

Furthermore, if the CU is in a B slice, motion estimation module 102 may perform uni-directional prediction or bi-directional prediction for PUs of the CU. When motion estimation module 102 performs uni-directional prediction for a PU, motion estimation module 102 may search the reference pictures of list 1 for a reference sample for the PU. Motion estimation module 102 may then generate a reference index that indicates the reference picture in list 1 that contains the reference sample and a motion vector that indicates a spatial displacement between the PU and the reference sample. Motion estimation module 102 may output the reference indexes and motion vectors for PUs of a CU to entropy encoding module 116 and motion compensation module 104. Motion compensation module 104 may use the reference indexes and motion vectors of PUs of the CU to identify and retrieve the reference samples of the PUs. Motion compensation module 104 may then use pixel values of reference samples of PUs to generate the prediction data for the CU.

When motion estimation module 102 performs bi-directional prediction for a PU, motion estimation module 102 may search the reference pictures in list 0 for a reference sample for the PU and may also search the reference pictures in list 1 for another reference sample for the PU. Motion estimation module 102 may then generate reference indexes that indicate the reference samples and motion vectors that indicate spatial displacements between the reference samples and the PU. Motion estimation module 102 may output the reference indexes and motion vectors to entropy encoding module 116 and motion compensation module 104. Motion compensation module 104 may use the reference indexes and motion vectors to identify and retrieve the reference samples of the PUs. Motion compensation module 104 may then interpolate pixel values of the prediction data of the CU from pixel values in the reference samples of the PUs of the CU.

In some examples, motion estimation module 102 may generate data from which motion compensation module 104 or video decoder 30 may predict the motion vectors of PUs of a CU. In such examples, motion compensation module 104 or video decoder 30 may use the data and motion data from neighboring CUs to predict the motion vectors of the PUs of the CU. However, if a neighboring CU is not available, motion estimation module 102 may not use motion vectors of the neighboring CU to generate such data. Accordingly, motion estimation module 102 may use the techniques of this disclosure to determine the availabilities of neighboring CUs. The neighboring CU may be unavailable for various reasons. For example, the neighboring CU may be unavailable if video encoder 20 has not yet encoded the neighboring CU, if the neighboring CU does not exist, if the neighboring CU is in a different slice than the CU, or if video encoder 20 is otherwise unable to use data associated with the neighboring CU to predict the motion vectors of the PUs of the CU.

As part of performing an encoding operation on a CU, intra prediction module 106 may perform intra prediction on the CU. In other words, intra prediction module 106 may generate prediction data for the CU based on decoded pixel values in the same slice as the CU. Intra prediction may provide spatial compression.

To perform intra prediction on a CU, intra prediction module 106 may use multiple intra prediction modes to generate multiple sets of prediction data for the CU. When intra prediction module 106 uses an intra prediction mode to generate a set of prediction data for a CU, intra prediction module 106 may extend pixel values from neighboring CUs across the CU in a direction and/or gradient associated with the intra prediction mode. The neighboring CUs may be above, above and to the right, above and to the left, or to the left of the current CU, assuming a left-to-right, top-to-bottom (i.e., z-scan) encoding order for CUs and treeblocks. Intra prediction module 106 may use various numbers of intra prediction modes, e.g., 33 directional intra prediction modes, depending on the size of the CU.

If a neighboring CU is unavailable, intra prediction module 106 may be unable to use the pixel values of the neighboring CU to generate the prediction data for a CU. The neighboring CU may be unavailable for various reasons. For example, the neighboring CU may be unavailable if video encoder 20 has not yet encoded the neighboring CU, if the neighboring CU does not exist, if the neighboring CU is in a different slice than the CU, or if intra prediction module 106 is otherwise unable to use the pixel values of the neighboring CU to generate the prediction data of the CU. Accordingly, intra prediction module 106 may need to determine whether the neighboring CU is available. In some examples, intra prediction module 106 may use the techniques of this disclosure to determine the availabilities of neighboring CUs.

In some examples, if intra prediction module 106 determines that the neighboring CU does not exist, intra prediction module 106 may generate the prediction data of the CU using default pixel values instead of the actual pixel values of the neighboring CU. Furthermore, in some examples, if intra prediction module 106 determines that the neighboring CU does not exist, intra prediction module 106 may generate the prediction data of the CU using synthesized pixel values instead of the actual pixel values of the neighboring CU. Intra prediction module 106 may generate the synthesized pixel values based on pixel values of neighboring CUs that are available.

Intra prediction module 106 may select one of the sets of prediction data for the CU. In various examples, intra prediction module 106 may select the set of prediction data for the CU in various ways. For example, intra prediction module 106 may select the set of prediction data for the CU by calculating distortion rates for the sets of prediction data and selecting the set of prediction data that has the lowest distortion rate.

Mode select module 100 may select the prediction data for a CU from among the prediction data generated by motion compensation module 104 for the CU or the prediction data generated by intra prediction module 106 for the CU. In some examples, mode select module 100 selects the prediction data for the CU based on error (i.e., distortion) in the sets of prediction data. In some examples, mode select module 100 selects the prediction data for the CU based on a rate-distortion metric that balances the number of coding bits versus the distortion in the resulting coded data.

After mode select module 100 selects the prediction data for a CU, residual generation module 110 may perform a residual generation operation that generates residual data for the CU based on the predicted data for the CU. The residual data for the CU may indicate differences in pixel values between the original pixel values for the CU and the prediction data for the CU. In some examples, performing the residual generation operation may comprise subtracting the prediction data of the CU from the pixel values of the CU. The residual data of a CU may include 2D residual blocks that correspond to different pixel components of the pixels in the CU. For example, the residual data may include a residual block that corresponds to differences between luminance components of pixels in the prediction data of the CU and luminance components of pixels in the original pixels of the CU. In addition, the residual data of the CU may include residual blocks that correspond to the differences between chrominance components of pixels in the prediction data of the CU and the chrominance components of the original pixels of the CU.

As described above, a CU may have one or more TUs. Each TU of a CU may correspond to a different portion of the residual data of the CU. The sizes of the TUs of a CU may or may not be based on the sizes of PUs of the CU. In some examples, video encoder 20 may use recursive quadtree partitioning to subdivide a CU into TUs. The resulting data structure may be referred to as a "residual quad tree" (RQT). Each node in the RQT may correspond to a TU of the CU. When determining an availability of a neighbor in accordance with the techniques of this disclosure, a video coder may use a RQT as an extension of a quadtree of CUs of a treeblock.

Transform module 112 may generate transform coefficient blocks for each non-partitioned TU of a CU by applying a transform to the residual data corresponding to the TU. For instance, transform module 112 may apply a transform to a particular portion of the residual data to generate a transform coefficient block. Each of the transform coefficient blocks may be a 2D matrix of coefficients. In various examples, transform module 112 may apply various transforms to the residual data corresponding to a TU. For example, transform module 112 may apply a discrete cosine transform (DCT), a directional transform, or a conceptually similar transform.

After transform module 112 generates a transform coefficient block for a TU, quantization module 114 may quantize the coefficients in the transform coefficient block. Quantization generally refers to a process in which coefficients in a transform coefficient block are quantized to possibly reduce the amount of data used to represent the coefficients, providing further compression. Quantization may reduce the bit depth associated with some or all of the coefficients. For example, an n-bit value may be rounded down to an m-bit value during quantization, where n is greater than m.

After quantization module 114 quantizes a transform coefficient block, entropy encoding module 116 may perform an entropy encoding operation on the transform coefficient block. In various examples, video encoder 20 may perform various types of entropy encoding operations on the transform coefficient block. For example, video encoder 20 may perform a context adaptive variable length coding (CAVLC) operation, a context adaptive binary arithmetic coding (CABAC) operation, a syntax-based context-adaptive binary arithmetic coding (SBAC) operation, a Probability Interval Partitioning Entropy (PIPE) coding operation, or another type of entropy encoding operation on the transform coefficient block. Video encoder 20 may also perform entropy encoding operations on syntax elements associated with the video data.

To perform CABAC, entropy encoding module 116 may assign a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively short codes correspond to more probable symbols, while relatively long codes correspond to less probable symbols. In this way, the use of VLC may achieve a bit savings over using equal-length codewords for each symbol to be transmitted. The probability determination may be based on a context assigned to the symbol.

In some examples, when entropy encoding module 116 performs an entropy encoding operation on a transform coefficient block, entropy encoding module 116 may select one or more context models for encoding the transform coefficient block based on data associated with a TU that neighbors the TU associated with the transform coefficient block. However, entropy encoding module 116 may be unable to select a context model for encoding the transform coefficient block if the neighboring TU is unavailable. The neighboring TU may be unavailable for various reasons. For example, the neighboring TU may be unavailable if entropy encoding module 116 has not yet performed an entropy encoding operation on the neighboring TU or if entropy encoding module 116 is otherwise unable to access data generated by performing an entropy encoding operation on the neighboring TU. Accordingly, entropy encoding module 116 may determine whether the neighboring TU is available. In some such examples, entropy encoding module 116 may use the techniques of this disclosure to determine the availabilities of the TUs that neighbor the TU. Similar considerations may apply when performing entropy encoding operations on other syntax elements of a CU.

Inverse quantization module 118 and inverse transform module 120 may apply inverse quantization and inverse transformation to a transform coefficient block, respectively, to decode residual data for a coding unit from the transform coefficient block. Reconstruction module 122 may add the reconstructed residual data to prediction data generated by motion compensation module 104 or intra prediction module 106 to produce a reconstructed video block for storage in decoded picture buffer 124. In other words, reconstruction module 122 may reconstruct pixel values for the video unit based on the prediction data for the video unit and the residual data for the video unit. Motion estimation module 102 and motion compensation module 104 may use a reference picture that contains the reconstructed video block to perform inter prediction on CUs of subsequent pictures. Video decoder 30 may output the picture, the picture including the pixel values for the current video unit.

After video encoder 20 performs entropy encoding on a transform coefficient block, video encoder 20 may include data representing the entropy encoded transform coefficient block in the bitstream for the video data. The bitstream may be a sequence of bits that forms a representation of coded pictures and associated data. The bitstream may comprise a sequence of network abstraction layer (NAL) units. Each of the NAL units may be a syntax structure containing an indication of a type of data in the NAL unit and bytes containing the data. For example, a NAL unit may contain data representing a PPS, a coded slice, supplemental enhancement information, an access unit delimiter, filler data, or another type of data. The data of a NAL unit may be in the form of a raw byte sequence payload (RBSP) interspersed with emulation prevention bits. A RBSP may be a syntax structure containing an integer number of bytes that is encapsulated within a NAL unit.

Figure 8:
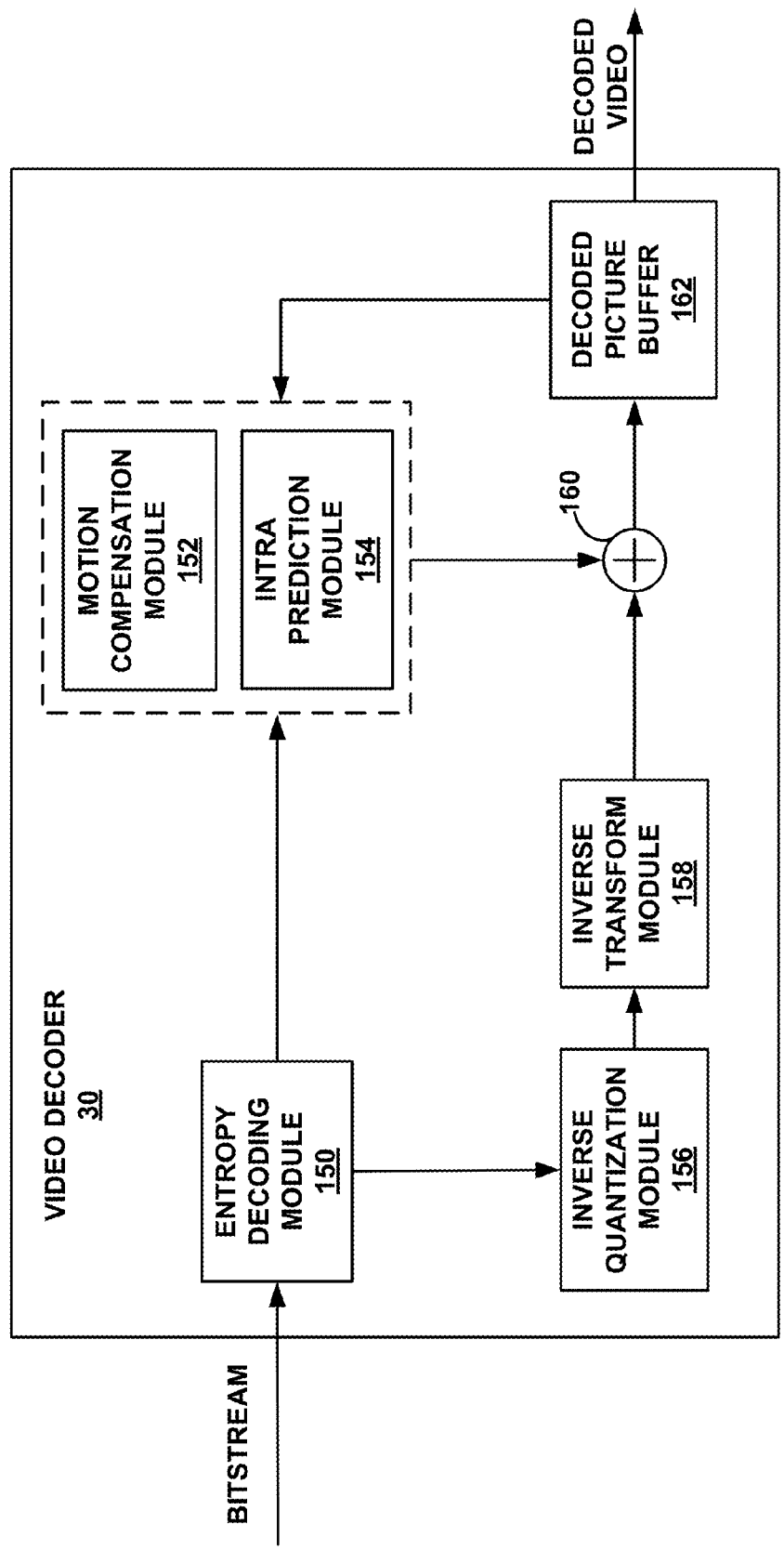
FIG. 8 is a block diagram that illustrates an example of a video decoder that decodes an encoded video sequence.

FIG. 8 is a block diagram that illustrates an example configuration of video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 8, video decoder 30 includes a plurality of functional components. The functional components of video decoder 30 include an entropy decoding module 150, a motion compensation module 152, an intra prediction module 154, an inverse quantization module 156, an inverse transform module 158, a reconstruction module 160, and a decoded picture buffer 162. In some examples, video decoder 30 may perform a decoding pass generally reciprocal to the encoding pass described with respect to video encoder 20 of FIG. 7. In other examples, video decoder 30 may include more, fewer, or different functional components. For example, video decoder 30 may include a deblocking filter to filter the output of reconstruction module 160 to remove blockiness artifacts from reconstructed video.

Video decoder 30 may receive a bitstream that comprises encoded video data. When video decoder 30 receives the bitstream, video decoder 30 performs a decoding operation on the bitstream to reconstruct the pixels values in each picture of the video data. As part of performing the decoding operation on the bitstream, video decoder 30 may perform decoding operations on each treeblock of each picture in the video data. Video decoder 30 may perform the decoding operations on the treeblocks within a picture in raster scan order. As part of performing a decoding operation on a treeblock, video decoder 30 may, at each level of the quadtree of the treeblock, perform decoding operations on the CUs of the treeblock at the level in z-scan order.

As part of performing a decoding operation on a non-partitioned CU, video decoder 30 may, at each level of the residual quadtree of the non-partitioned CU, perform a decoding operation on each TU of the CU in z-scan order. By performing the decoding operation for each TU of the CU, video decoder 30 may reconstruct the residual data of the CU.

As part of performing a decoding operation for a non-partitioned TU, entropy decoding module 150 may perform an entropy decoding operation on an encoded version of a transform coefficient block associated with the TU. In some examples, entropy decoding module 150 may use CABAC to decode the transform coefficient block. In such examples, entropy decoding module 150 may select a context model based on data generated by performing an entropy decoding operation on a transform coefficient block associated with a neighboring TU. Entropy decoding module 150 may use the selected context model to decode the transform coefficient block.

However, entropy decoding module 150 may be unable to select a context model based on data generated by performing an entropy decoding operation on a transform coefficient block associated with the neighboring TU if the neighboring TU is unavailable. The neighboring TU may be unavailable for various reasons. For example, the neighboring TU may be unavailable if entropy decoding module 150 has not yet performed an entropy decoding operation for the neighboring TU or if entropy decoding module 150 is otherwise unable to use data generated by performing an entropy decoding operation for the neighboring TU. Accordingly, entropy decoding module 150 may determine whether the neighboring TU is available. In such examples, entropy decoding module 150 may use the techniques of this disclosure to determine whether the neighboring TU is available. In this way, a video coder (e.g., video encoder 20 or video decoder 30) may select, based on data associated with a video unit that neighbors a given video unit, a context model and perform, based on the selected context model, an entropy coding operation on data associated with a given video unit.

Furthermore, as part of performing a decoding operation on a non-partitioned TU, inverse quantization module 156 may inverse quantize, i.e., de-quantize, the transform coefficient block associated with the TU. Inverse quantization module 156 may inverse quantize the transform coefficient block in a manner similar to the inverse quantization processes proposed for HEVC or defined by the H.264 decoding standard. Inverse quantization module 156 may use a quantization parameter QP calculated by video encoder 20 for a CU of the transform coefficient block to determine a degree of quantization and, likewise, a degree of inverse quantization for inverse quantization module 156 to apply.

After inverse quantization module 156 inverse quantizes the transform coefficient block, inverse transform module 158 may generate residual data for the TU associated with the transform coefficient block. Inverse transform module 158 may generate the residual data for the TU at least in part by applying an inverse transform to the transform coefficient block. For example, inverse transform module 158 may apply an inverse DCT, an inverse integer transform, an inverse Karhunen-Loeve transform (KLT), an inverse rotational transform, an inverse directional transform, or another inverse transform to the transform coefficient block. In some examples, inverse transform module 158 may determine an inverse transform to apply to the transform coefficient block based on signaling from video encoder 20. In such examples, inverse transform module 158 may determine the inverse transform based on a signaled transform at the root node of a quadtree for a treeblock associated with the transform coefficient block. In other examples, inverse transform module 158 may infer the inverse transform from one or more coding characteristics, such as block size, coding mode, or the like. In some examples, inverse transform module 158 may apply a cascaded inverse transform.

Motion compensation module 152 may perform motion compensation to generate prediction data for a CU. To perform motion compensation, motion compensation module 152 may predict the motion information for PUs of the CU based on motion information of PUs of CUs that neighbor the CU. In some examples, motion compensation module 152 may predict the motion information of the PUs using merge/skip mode or AMVP mode. Motion compensation module 152 may use the motion information for the PUs of the CU to identify reference samples for the PUs. Motion compensation module 152 may then use the reference samples for the PUs to generate prediction data for the CU.

However, motion compensation module 152 may be unable to predict the motion information for a PU of a CU based on motion information of PU of a neighboring CU if the neighboring CU is unavailable. The neighboring CU may be unavailable for various reasons. For example, the neighboring CU may be unavailable if video decoder 30 has not yet decoded the neighboring CU, if the neighboring CU does not exist, if the neighboring CU is in a different slice than the CU, or if motion compensation module 152 is otherwise unable to use data associated with the neighboring CU to predict motion information for PUs of the CU. Accordingly, motion compensation module 152 may determine whether neighboring CUs are available. Motion compensation module 152 may use the techniques of this disclosure to determine whether neighboring CUs are available.

In some examples, motion compensation module 152 may refine the prediction data for a CU by performing interpolation based on interpolation filters. Identifiers for interpolation filters to be used for motion compensation with sub-pixel precision may be included in the syntax elements. Motion compensation module 152 may use the same interpolation filters used by video encoder 20 during generation of the prediction data of the CU to calculate interpolated values for sub-integer pixels of a reference block. Motion compensation module 152 may determine the interpolation filters used by video encoder 20 according to received syntax information and use the interpolation filters to produce prediction data.

Intra prediction module 154 may perform intra prediction to generate prediction data for the CU. For example, intra prediction module 154 may determine an intra prediction mode for the CU based on syntax elements in the bitstream. Intra prediction module 154 may then use the intra prediction mode to generate prediction data (e.g., predicted pixel values) for the CU based on the pixel values of neighboring CUs.

However, intra prediction module 154 may be unable to use the pixel values of a neighboring CU if the neighboring CU is unavailable. The neighboring CU may be unavailable for various reasons. For example, the neighboring CU may be unavailable if video decoder 30 has not yet decoded the neighboring CU, if the neighboring CU does not exist, if the neighboring CU is in a different slice than the CU, or if intra prediction module 154 is otherwise unable to use the pixel values of the neighboring CU to generate the prediction data of the CU. Accordingly, intra prediction module 154 may determine whether the neighboring CU is available. Intra prediction module 154 may use the techniques of this disclosure to determine whether neighboring CUs are available. If an intra prediction mode of the CU entails the use of pixel values of an unavailable neighboring CU, intra prediction module 154 may generate the prediction data of the CU using default or synthesized pixel values instead of using pixel values of the unavailable neighboring CU.

Motion compensation module 152 and intra prediction module 154, in an HEVC example, may use some of the syntax information (e.g., provided by a quadtree) to determine sizes of treeblocks used to encode picture(s) of the encoded video sequence, split information that describes how each CU of a picture of the encoded video sequence is split (and likewise, how sub-CUs are split), modes indicating how each CU is encoded (e.g., intra- or inter-prediction, and for intra-prediction an intra-prediction encoding mode), one or more reference frames (and/or reference picture lists containing identifiers for the reference frames) for each inter-predicted CU, and other information to decode the encoded video sequence.

Reconstruction module 160 may use the residual data of a CU and the prediction data for the CU to reconstruct pixel values for the CU. In some examples, video decoder 30 may apply a deblocking filter to remove blockiness artifacts from the reconstructed pixel values filter of a slice or picture. Decoded picture buffer 162 may store the decoded pixel values for pictures of the video data. Decoded picture buffer 162 may provide reference pictures for subsequent motion compensation, intra prediction, and presentation on a display device, such as display device 32 of FIG. 1.

Figure 9:
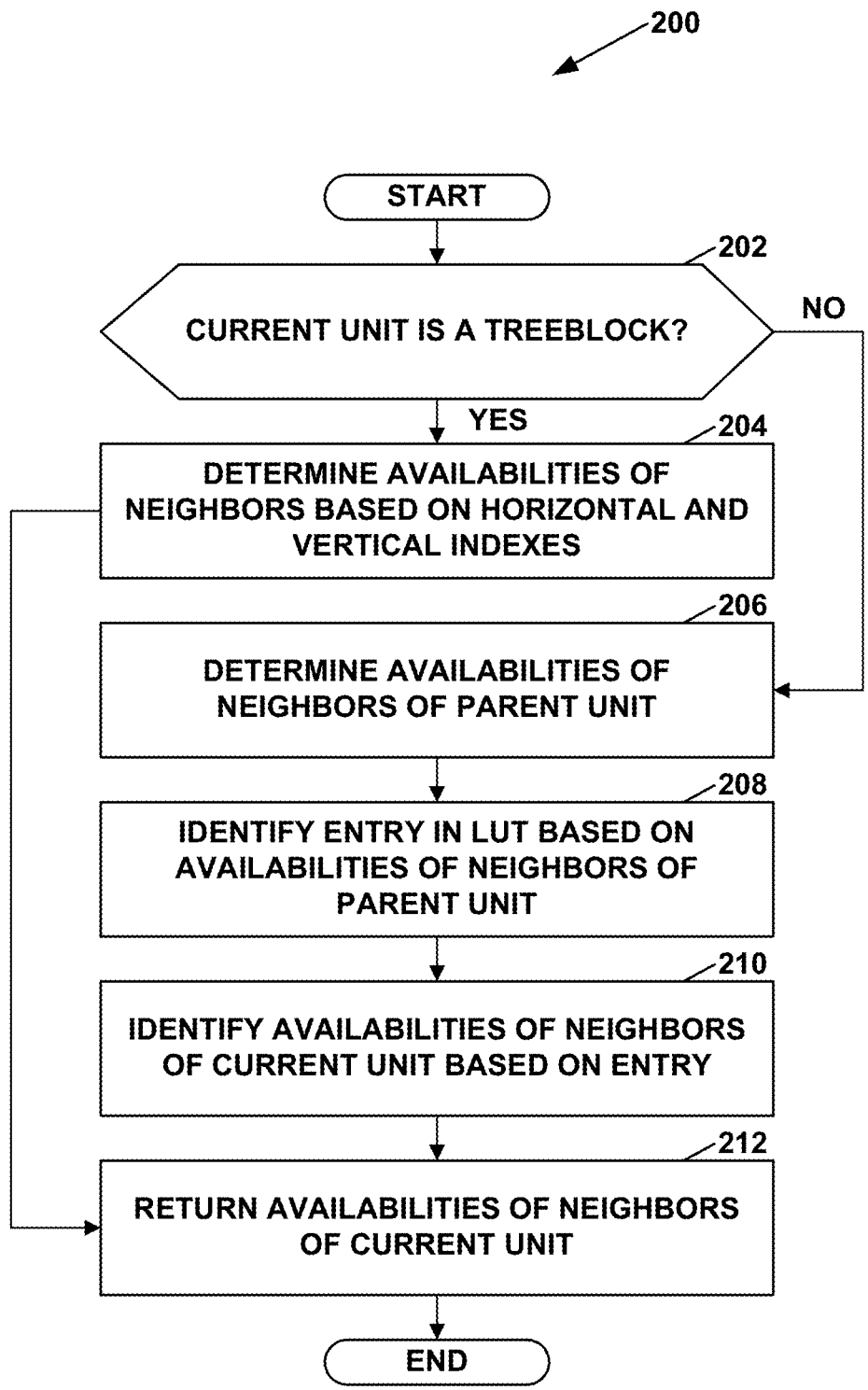
FIG. 9 is a flowchart that illustrates an example recursive operation to determine the availabilities of neighbors of a current video unit.

FIG. 9 is a flowchart that illustrates an example recursive operation 200 to determine the availabilities of neighbors of a current video unit. As described elsewhere in this disclosure, a video coder, such as video encoder 20 and video decoder 30, may determine whether neighboring video units are available for various reasons. The video coder may perform operation 200 for any of such reasons. For example, if the video coder is a video encoder, the video coder may perform operation 200 when determining motion information for a PU of a CU. In this example, the video coder may determine the availabilities of neighboring CUs and signal the motion information of the PU based on the motion information of a PU of one of the available neighboring CUs. In another example, if the video coder is a video decoder, the video coder may perform operation 200 when performing an intra prediction operation for a CU. In this example, the video coder may determine the availabilities of neighboring CUs and use default or synthesized pixel values if an intra prediction mode of the CU entails the use of pixel values of an unavailable CU.

When a video coder (such as video encoder 20 or video decoder 30) determines the availabilities of the neighboring video units of the current video unit, the video coder determines whether the current video unit is a treeblock (202). If the current video unit is a treeblock ("YES" of 202), the video coder may determine the availabilities of neighboring video units based on the horizontal and vertical indexes of the current video unit and information about the slice that contains the current video unit (204). For instance, after determining that the current video unit is a treeblock, the video coder may determine the availability of the neighbor of the current video unit based on a position of the current video unit within a picture.

For example, if the current video unit is a treeblock, the current video unit may have a horizontal index of 1 and a vertical index of 1, i.e., the current video unit is at coordinates (1, 1). In this example, treeblock may be coded according to a raster scan order. Hence, if the treeblock to the above left of the current video unit (i.e., the above left neighbor), the treeblock above the current video unit (i.e., the above neighbor), the treeblock to the above right of the current video unit (i.e., the above right neighbor), the treeblock to the left of the current video unit (i.e., the left neighbor) are in the same slice as the treeblock, the above left neighbor, the above neighbor, the above right neighbor and the left neighbor are available. However, the treeblock to the bottom left of the current video unit (i.e., the below left neighbor) is not available. The below left neighbor is not available because, in this example, the video coder codes the treeblocks according to a raster scan order and the current video unit occurs prior to the below left neighbor in the raster scan order.

If the current video unit is not a treeblock ("NO" of 202), the current video unit is a sub-unit of a treeblock. Thus, to determine whether a neighbor of the current video unit is available, the video coder may determine the availabilities of the neighbors of the parent video unit of the current video unit (206). The parent video unit of the current video unit may correspond to the quadtree node immediately above the quadtree node that corresponds to the current video unit. FIG. 5 shows an example quadtree partitioning hierarchy with successive sub-CU levels.

To determine the availabilities of the neighbors of the parent video unit, the video coder may recursively invoke operation 200. That is, the video coder may determine the availabilities of neighbors of the parent video unit at least in part by recursively performing operations to determine the availabilities of neighbors of ancestor video units of the current video unit. Ancestor video units may be video units above the current video unit in a quadtree data structure. When the video coder recursively invokes operation 200, the parent video unit of the current node is the "current" node. Thus, if the parent video unit is a treeblock, the video coder may determine the availabilities of the neighbors of the parent video unit based on the horizontal and vertical indexes of the parent video unit as described above. On the other hand, if the parent video unit is not a treeblock, the video coder may determine the availabilities of the neighbors of the parent video unit's parent video unit (i.e., the grandparent video unit).

If the grandparent video unit is a treeblock, the video coder may determine the availabilities of neighbors of the grandparent video unit using the horizontal and vertical indexes of the grandparent video unit, as described above. If the grandparent video unit is not a treeblock, the video coder may determine the availabilities of the parent video unit of the grandparent video unit (i.e. the great-grandparent video unit). This process of progressing up through the ancestor video units of the current video unit may continue in this manner until a treeblock (i.e., an ancestral treeblock) is reached and the video coder is able to determine the availabilities of the neighbors of the ancestral treeblock. Once the video coder determines the availabilities of the ancestral treeblock of the current video unit, the video coder may work back down through the ancestor video units of the current video unit. For the video unit at each generation, the video coder uses the availabilities of the video unit's parent video unit to identify an entry in an LUT. The LUT may include entries multiple combinations of availabilities of the neighbors of the parent video unit. The identified entry indicates the availabilities of the video unit's neighbors.

After the video coder has determined the availabilities of the neighbors of the current video unit's parent video unit, the video coder uses the availabilities of the neighbors of the current video unit's parent video unit to identify an entry in the LUT (208). The identified entry may include a series of values, each of the values indicating an availability of a different neighbor of the current video unit. The video coder may then identify the availabilities of neighbors of the current video unit based on the identified entry (210). The entry identified using the availabilities of the neighbors of the current video unit's parent video unit indicates the availabilities of the current video unit's neighbors.

The following is an example LUT.

TABLE 1

| Availabilities of parent video unit's neighbors | Availabilities of SubU0's neighbors | Availabilities of SubU1's neighbors | Availabilities of SubU2's neighbors | Availabilities of SubU3's neighbors |
| --- | --- | --- | --- | --- |
| 00000 | 00000 | 00010 | 11000 | 01110 |
| 00001 | 00000 | 00010 | 11001 | 01110 |
| 00010 | 00011 | 00010 | 11110 | 01110 |
| 00011 | 00011 | 00010 | 11111 | 01110 |
| 00100 | 00100 | 00010 | 11000 | 01110 |
| 00101 | 00100 | 00010 | 11001 | 01110 |
| 00110 | 00111 | 00010 | 11110 | 01110 |
| 00111 | 00111 | 00010 | 11111 | 01110 |
| 01000 | 11000 | 01110 | 11000 | 01110 |
| 01001 | 11000 | 01110 | 11001 | 01110 |
| 01010 | 11011 | 01110 | 11110 | 01110 |
| 01011 | 11011 | 01110 | 11111 | 01110 |

TABLE 1-continued

| Availabilities of parent video unit's neighbors | Availabilities of SubU0's neighbors | Availabilities of SubU1's neighbors | Availabilities of SubU2's neighbors | Availabilities of SubU3's neighbors |
|---|---|---|---|---|
| 01100 | 11100 | 01110 | 11000 | 01110 |
| 01101 | 11100 | 01110 | 11001 | 01110 |
| 01110 | 11111 | 01110 | 11110 | 01110 |
| 01111 | 11111 | 01110 | 11111 | 01110 |
| 10000 | 00000 | 10010 | 11000 | 01110 |
| 10001 | 00000 | 10010 | 11001 | 01110 |
| 10010 | 00011 | 10010 | 11110 | 01110 |
| 10011 | 00011 | 10010 | 11111 | 01110 |
| 10100 | 00100 | 10010 | 11000 | 01110 |
| 10101 | 00100 | 10010 | 11001 | 01110 |
| 10110 | 00111 | 10010 | 11110 | 01110 |
| 10111 | 00111 | 10010 | 11111 | 01110 |
| 11000 | 11000 | 11110 | 11000 | 01110 |
| 11001 | 11000 | 11110 | 11001 | 01110 |
| 11010 | 11011 | 11110 | 11110 | 01110 |
| 11011 | 11011 | 11110 | 11111 | 01110 |
| 11100 | 11100 | 11110 | 11000 | 01110 |
| 11101 | 11100 | 11110 | 11001 | 01110 |
| 11110 | 11111 | 11110 | 11110 | 01110 |
| 11111 | 11111 | 11110 | 11111 | 01110 |

The example LUT of Table 1 includes five columns and thirty-two rows. The first column specifies possible availabilities of neighbors of the current video unit's parent video unit. The second column specifies the availabilities of the current video unit's neighbors if the current video unit is the top left sub-unit of the parent video unit. The third column specifies the availabilities of the current video unit's neighbors if the current video unit is the top right sub-unit of the parent video unit. The fourth column specifies the availabilities of the current video unit's neighbors if the current video unit is the bottom left sub-unit of the parent video unit. The fifth column specifies the availabilities of the current video unit's neighbors if the current video unit is the bottom right sub-unit of the parent video unit. Thus, the LUT may include entries for other child video units of the current video unit's parent video unit, the entries for the other child video units indicating availabilities of neighbors of the other child video units.

In the example LUT of Table 1, the availabilities of neighbors of video units are represented as five-bit binary numbers. Each bit in the binary numbers corresponds to the availability of a different neighbor. For instance, a first bit (i.e., the right-most bit) may correspond to the below-left neighbor, the second bit may correspond to the left neighbor, the third bit may correspond to the above-left neighbor, the fourth bit may correspond to the above neighbor, and the fifth (i.e., left-most) bit may correspond to the above-right neighbor. If a bit is 0, the corresponding neighbor is not available. If a bit is 1, the corresponding neighbor is available.

To use the example LUT of Table 1 to determine the availabilities of the current video unit's neighbors, the video coder may first identify a row in the LUT that has a value in the first column (i.e., parent's neighbors) column that corresponds to the availabilities of the neighbors of the current video unit's parent video unit. Second, the video coder identifies a column in the LUT based on whether the current video unit is the top-left, top-right, bottom-left, or bottom-right sub-unit of the parent video unit. The video coder then uses the value in the identified row and column of the LUT to determine the availabilities of the current video unit's neighbors.

In this way, given the neighbor availabilities of a video unit, the video coder may immediately determine the sub-units of the video unit. As a result, based on the neighbor availabilities of a treeblock, which can be derived by the treeblock's horizontal and vertical indices and the treeblock's slice information, the neighbor availabilities of any video unit at any depth within the quadtree of the treeblock can be determined recursively. That is, for any individual video unit within a quadtree, the video unit's neighbor availabilities can be obtained recursively from the root. Thus, detection of a video unit's neighbor availabilities may only need two factors: the video unit's position at the depth of a quadtree and the neighbor availabilities of the parent video unit of the video unit. Also, the availabilities of all five neighboring video units may be jointly determined by one single LUT operation. This may be highly efficient.

After identifying availabilities of the current video unit's neighbors in steps 204 or 210, the video coder returns the availabilities of the current video unit's neighbors to a caller of operation 200 (212). For example, if the current video unit is partitioned, the caller of operation 200 may be another instance of operation 200. In this example, the video coder may return the availabilities of the current video unit's neighbors to the other instance of operation 200. In another example, if the current video unit is a non-partitioned video unit, the caller of operation 200 may be an intra prediction process. In this example, the video coder may return the availabilities of the current video unit's neighbors to the intra prediction process.

The following pseudo C code shows an example recursive function for outputting the availabilities of video units that neighbor a current video unit and each sub-unit within the current video unit.

```
void HEVC_NeighborAvail(nAvail)
{
    if (TRUE == bSplitFlag) {
        HEVC_NeighborAvail(anAvailLut[nAvail][0]);
        HEVC_NeighborAvail(anAvailLut[nAvail][1]);
        HEVC_NeighborAvail(anAvailLut[nAvail][2]);
        HEVC_NeighborAvail(anAvailLut[nAvail][3]);
    }
    else {
        //nAvail
    }
}
```

In the pseudo-code above, the function "HEVC_NeighborAvail" receives a parameter "nAvail" that indicates the availabilities of video units that neighbor a current video unit. The function "HEVC_NeighborAvail" then determines whether the current video unit is split into sub-units. If so, the function "HEVC_NeighborAvail" uses the availabilities of the video units that neighbor the current video unit to look up in the LUT the availabilities of video units that neighbor each sub-unit of the current video unit. The function "HEVC_NeighborAvail" may recursively invoke itself using parameters that indicate the availabilities of video units that neighbor the sub-units of the current video unit. If the current video unit is not split into sub-units, the function "HEVCNeighborAvail" may output the availabilities of the video units that neighbor the current video unit. In this way, the function "HEVC_NeighborAvail" may output the availabilities of video units that neighbor the current video unit and each sub-unit within the current video unit.

Although operation 200 is presented as a recursive operation, the video coder may perform a non-recursive operation that uses a LUT and the availabilities a current video unit's parent to determine the availabilities of the current video unit's neighbors. In other words, the video coder may determine the availabilities of neighbors of the parent video unit at least in part by performing a non-recursive operation to determine the availabilities of neighbors of ancestor video units of the current video unit. The non-recursive operation may have similar efficiency to the recursive operation described above. The following is example code implementing a non-recursive operation that identifies, based on availabilities of video units that neighbor a parent video unit of the current video unit, an entry in a LUT, the identified entry indicating an availability of a neighbor of the current video unit.

```
#include <stdlib.h>
#include <stdio.h>
#ifndef FAILURE
#define FAILURE 0
#endif
#ifndef SUCCESS
#define SUCCESS 1
#endif
#define MAX_DEPTH 16
typedef signed char        Word8;
typedef unsigned char      UWord8;
typedef signed short int   Word16;
typedef unsigned short     UWord16;
typedef signed int         Word32;
typedef unsigned int       UWord32;
typedef long long          Word64;
typedef unsigned long long UWord64;
UWord8 anNeighborAvailabilityLut[32][4] =
//bit 0; sw; bit 1; w; bit 2: nw; bit 3: n; bit 4: ne
{
    { 0,  2, 24, 14},
    { 0,  2, 25, 14},
    { 3,  2, 30, 14},
    { 3,  2, 31, 14},
    { 4,  2, 24, 14},
    { 4,  2, 25, 14},
    { 7,  2, 30, 14},
    { 7,  2, 31, 14},
    {24, 14, 24, 14},
    {24, 14, 25, 14},
    {27, 14, 30, 14},
    {27, 14, 31, 14},
    {28, 14, 24, 14},
    {28, 14, 25, 14},
    {31, 14, 30, 14},
    {31, 14, 31, 14},
    { 0, 18, 24, 14},
    { 0, 18, 25, 14},
    { 3, 18, 30, 14},
    { 3, 18, 31, 14},
    { 4, 18, 24, 14},
    { 4, 18, 25, 14},
    { 7, 18, 30, 14},
    { 7, 18, 31, 14},
    {24, 30, 24, 14},
    {24, 30, 25, 14},
    {27, 30, 30, 14},
    {27, 30, 31, 14},
    {28, 30, 24, 14},
    {28, 30, 25, 14},
    {31, 30, 30, 14},
    {31, 30, 31, 14}
};
UWord8 HEVC_ProcessQuadTree(UWord16 nNumUnit, UWord8
                                              *pUnitSizeInBlk,
                                              UWord8
nNeighborAvailability, UWord8 nMaxSizeInBlk)
{
    UWord32 i;
    UWord8 nDepth, nUnitSizeInBlk;
    UWord8 anSubCu[MAX_DEPTH];
    UWord8 anNeighborAvailability[MAX_DEPTH];
    nUnitSizeInBlk = nMaxSizeInBlk;
    nDepth = 0;
    anSubCu[nDepth] = 0;
    anNeighborAvailability[nDepth] = nNeighborAvailability;
    for (i=0; i<nNumUnit; i++) {
        while (nUnitSizeInBlk > pUnitSizeInBlk[i]) {
            nUnitSizeInBlk >>= 1;
            nDepth++;
            anSubCu[nDepth] = 0;
            anNeighborAvailability[nDepth] =
  anNeighborAvailabilityLut[anNeighborAvailability[nDepth-1]][0];
        }
        //derive neighbor availability for the current unit
        printf("Unit #%02d: Size = %02d, Neighbor Availability = %02d\n",
             i, pUnitSizeInBlk[i], anNeighborAvailability[nDepth]);
        anSubCu[nDepth]++;
        while (anSubCu[nDepth] >= 4) {
            nUnitSizeInBlk <<= 1;
            nDepth--;
            anSubCu[nDepth]++;
        }
        anNeighborAvailability[nDepth] =
            anNeighborAvailabilityLut[anNeighborAvailability
[nDepth-1]][anSubCu[nDepth]];
    }
}
main( )
{
    UWord8 nMaxSizeInBlk;
    UWord8 nMaxDepth = 4;
    UWord16 nNumUnit;
    UWord8 aUnitSizeInBlk[ ] = {2, 2, 2, 2, 4, 4, 2, 2, 2, 1, 1, 1, 1};
    UWord8 nNeighborAvailability;
    nMaxSizeInBlk = 1<<(nMaxDepth-1);
    nNumUnit = sizeof(aUnitSizeInBlk);
    nNeighborAvailability = 5;//the availability of the current LCU
    HEVC_ProcessQuadTree(nNumUnit, aUnitSizeInBlk,
nNeighborAvailability, nMaxSizeInBlk);
}
```

In the code provided above, an LUT "anNeighborAvailabilityLut" is initialized. A function "main ( )" invokes a function "HEVC_ProcessQuadTree ( )" The code above assumes that the availability for the current LCU is 5 (i.e., 00101). In other examples, values can be used for availability of the current LCU.

The function "HEVC_ProcessQuadTree ( )" prints the availabilities of each CU within the current LCU. The function "HEVC_ProcessQuadTree ( )" includes a "for" loop. The "for" loop determines the availabilities of video units that neighbor each video unit in the current LCU. The "for" loop determines the availabilities according to a depth-first search pattern.

During each iteration of the "for" loop, the video coder may perform a first "while" loop. The first "while" loop increases a current depth in order to move analysis to a current video unit that is one level above a maximum depth of the quadtree for the current LCU. As the first "while" loop moves analysis down the quadtree, the first "while" loop uses the LUT to determine the availabilities of video units that neighbor the top-left sub-unit. The "for" loop then iterates through each sub-unit of the current video unit, using the LUT to determine the availabilities of video units that neighbor the sub-units of the current video unit.

After determining that availabilities of the video units that neighbor each of the sub-units of the current video unit, a second "while" loop in the "for" loop decreases the current depth until a depth is reached at which not all CUs at the depth have been analyzed. The "for" loop then determines the availabilities of video units that neighbor a next video unit at the current level. The "for" loop may then repeat this operation with regard to the next video unit to determine the availabilities of video units that neighbor sub-units of the next video unit. The "for" loop may continue in this manner until the availabilities of video units that neighbor each video unit in the current LCU have been determined. The code provided above may be modified to only identify the availabilities of video units that neighbor a particular video unit.

Figure 10:
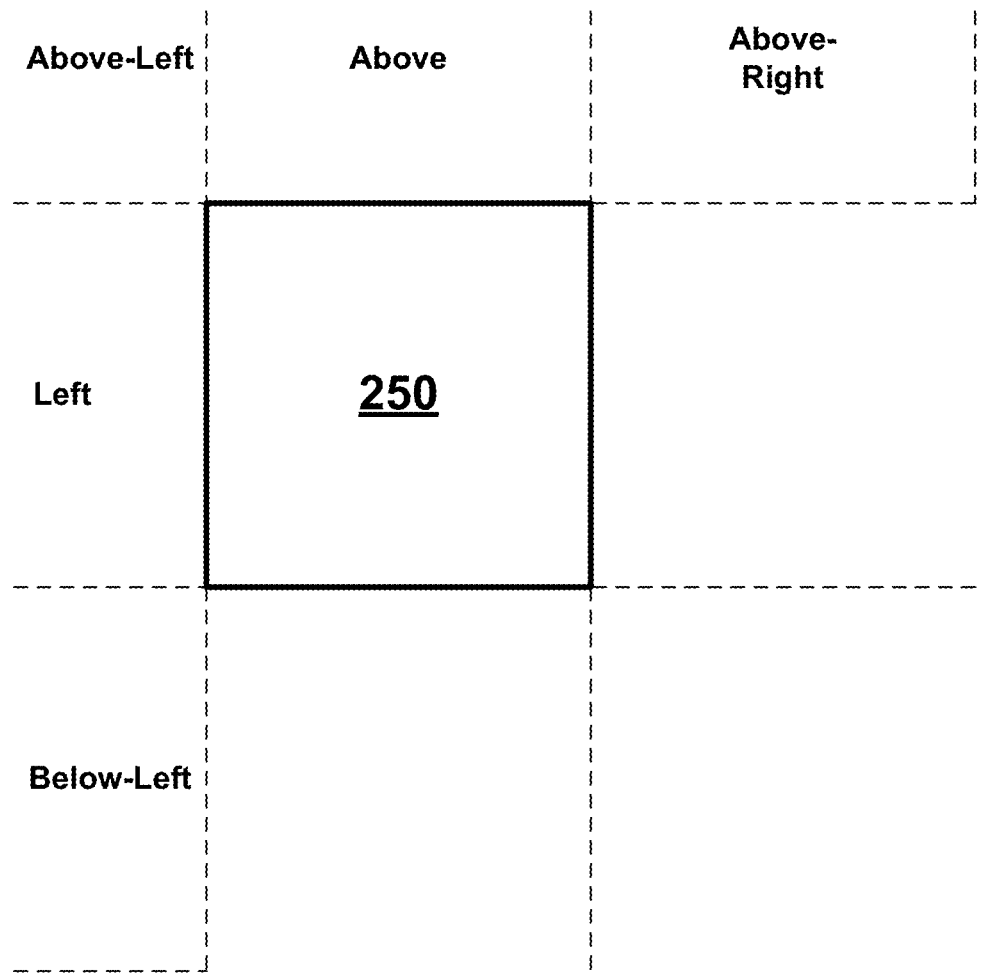
FIG. 10 is a conceptual diagram that illustrates example neighbors of a video unit.
Figure 11:
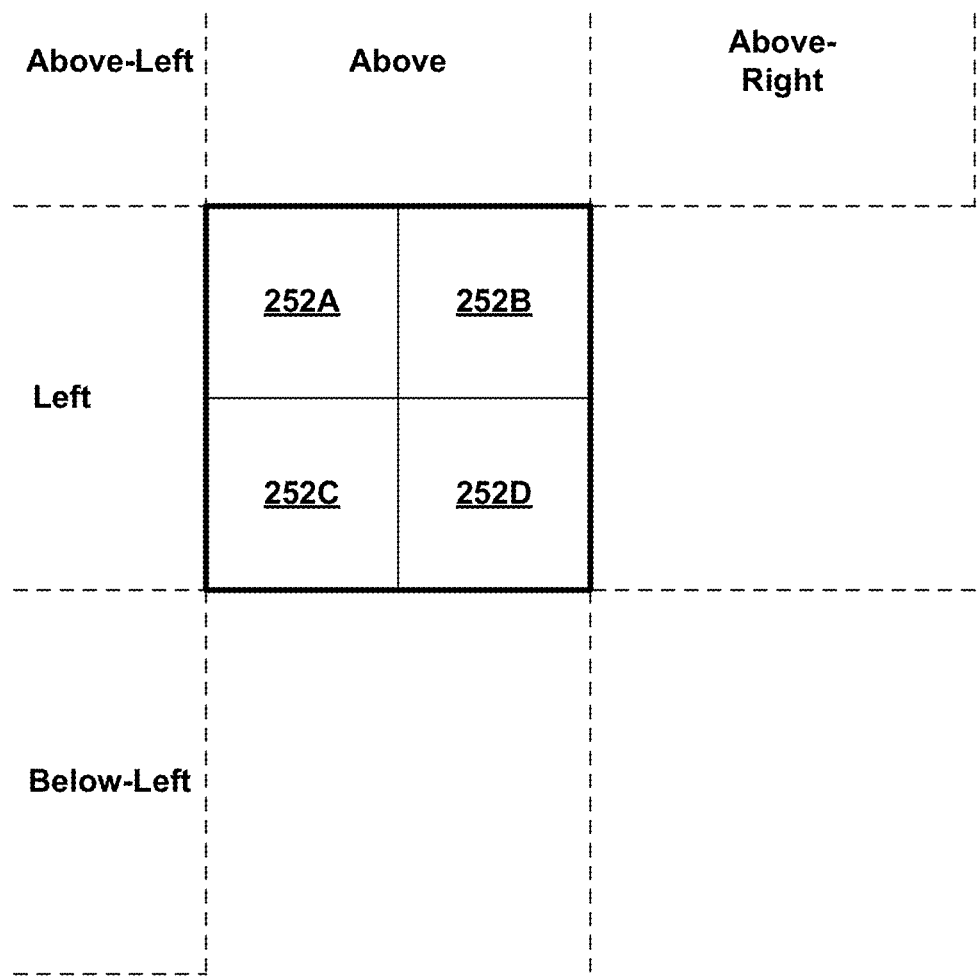
FIG. 11 is a conceptual diagram that illustrates example relationship between a subdivided non-leaf video unit and neighboring video units.

FIG. 10 is a conceptual diagram that illustrates the relationship between a given video unit 250 and neighboring video units. FIG. 11 illustrates the relationship of four sub-units 252A, 252B, 252C, and 252D (collectively, "sub-units 252") of video unit 250 to the neighboring video units of video unit 250.

The availabilities of neighbors of sub-units 252 may be summarized as follows. The neighbor availabilities of sub-unit 252A can be related to those of video unit 250 as follows.

BelowLeft(SubU0)=Left(U)
Left(SubU0)=Left(U)
AboveLeft(SubU0)=AboveLeft(U)
Above(SubU0)=Above(U)
AboveRight(SubU0)=Above(U)

Figure 12:
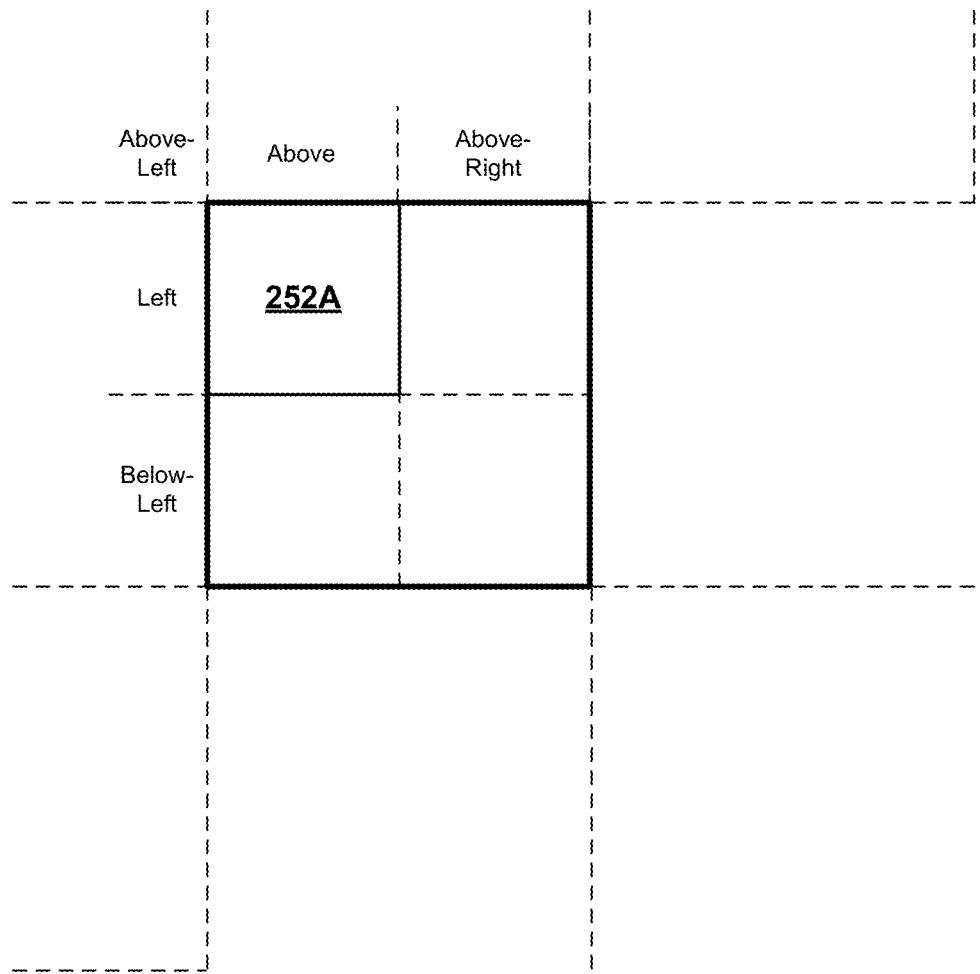
FIG. 12 is a conceptual diagram that illustrates example availabilities of neighbors of an upper-left sub-unit of a non-leaf video unit.

In the notation above, "BelowLeft(SubU0)" indicates the availability of the below-left neighbor of sub-unit 252A. "Left(U)" indicates the availability of the left neighbor of video unit 250. "Left(SubU0)" indicates the availability of the left neighbor of sub-unit 252A. "AboveLeft(SubU0)" indicates the availability of the above-left neighbor of sub-unit 252A. "AboveLeft(U)" indicates the availability of the above-left neighbor of video unit 250. "Above(SubU0)" indicates the availability of the above neighbor of sub-unit 252A. "Above(U)" indicates the availability of the above neighbor of video unit 250. "AboveRight(SubU0)" indicates the availability of the above-right neighbor of sub-unit 252A. FIG. 12 is a conceptual diagram that illustrates the neighbors of sub-unit 252A.

The neighbor availabilities of 252B can be related to those of video unit 250 as follows.

BelowLeft(SubU1)=FALSE
Left(SubU1)=TRUE
AboveLeft(SubU1)=Above(U)
Above(SubU1)=Above(U)
AboveRight(SubU1)=AboveRight(U)

Figure 13:
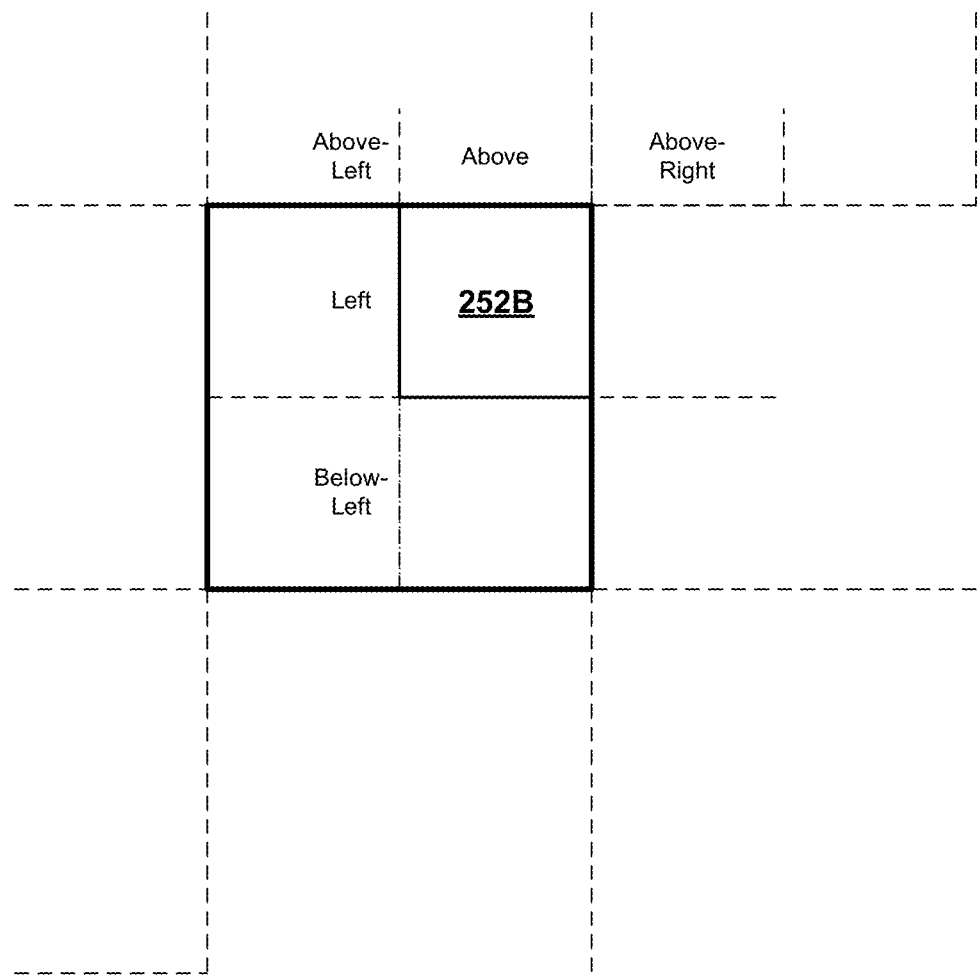
FIG. 13 is a conceptual diagram that illustrates example availabilities of neighbors of an upper-right sub-unit of a non-leaf video unit.

"FALSE" indicates that the neighboring video unit is not available. "TRUE" indicates that the neighboring video unit is available. In the notation above, "BelowLeft(SubU1)" indicates the availability of the below-left neighbor of sub-unit 252B. "Left(SubU1)" indicates the availability of the left neighbor of sub-unit 252B. "AboveLeft(SubU1)" indicates the availability of the above-left neighbor of sub-unit 252B. "Above(SubU1)" indicates the availability of the above neighbor of sub-unit 252B. "Above(U)" indicates the availability of the above neighbor of video unit 250. "AboveRight(SubU1)" indicates the availability of the above-right neighbor of sub-unit 252B. "AboveRight(U)" indicates the availability of the above-right neighbor of video unit 250. FIG. 13 is a conceptual diagram that illustrates the neighbors of sub-unit 252B.

The neighbor availabilities of sub-unit 252C may be related to those of video unit 250 as follows.

Figure 14:
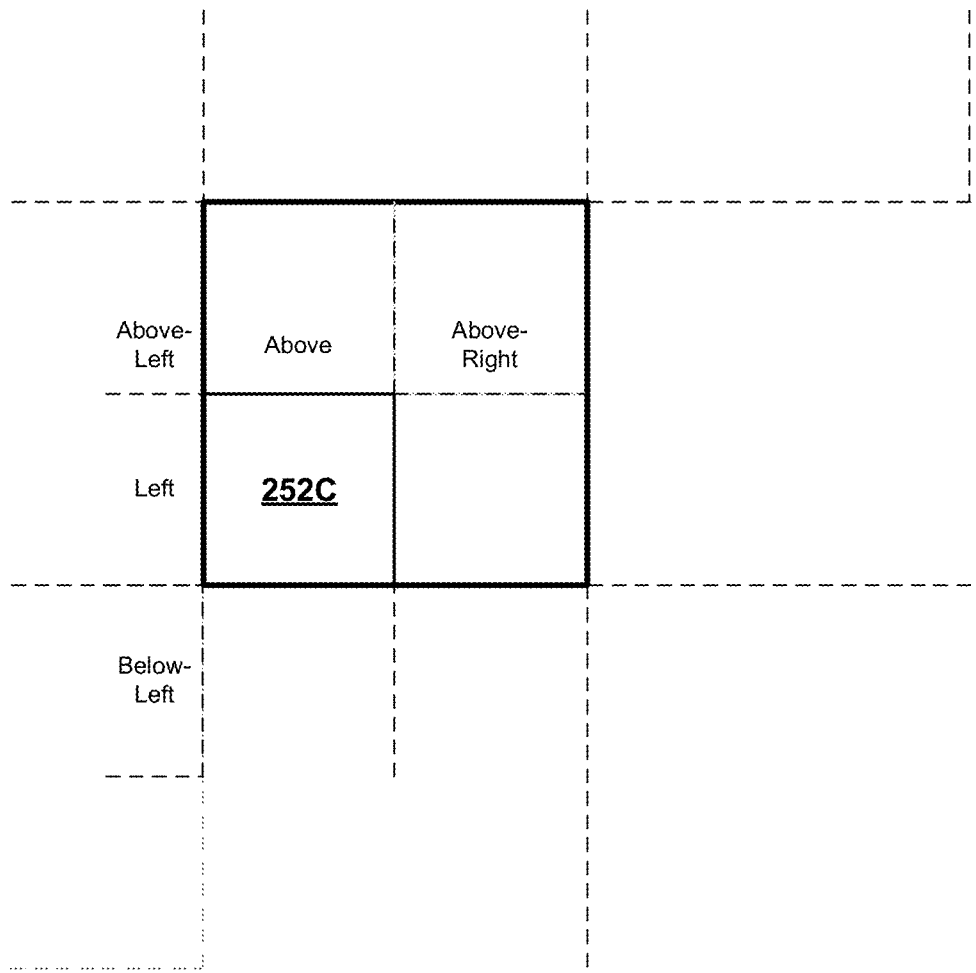
FIG. 14 is a conceptual diagram that illustrates example availabilities of neighbors of a lower-left sub-unit of a non-leaf video unit.

BelowLeft(SubU2)=BelowLeft(U)
Left(SubU2)=Left(U)
AboveLeft(SubU2)=Left(U)
Above(SubU2)=TRUE
AboveRight(SubU2)=TRUE In the notation above, "BelowLeft(SubU2) indicates the availability of the below-left neighbor of sub-unit 252C. "BelowLeft(U)" indicates the availability of the below-left neighbor of video unit 250. "Left(SubU2)" indicates the availability of the left neighbor of sub-unit 252C. "Left(U)" indicates the availability of the left neighbor of video unit 250. "AboveLeft(SubU2)" indicates the availability of the above-left neighbor of sub-unit 252C. "Above(SubU2)" indicates the availability of the above neighbor of sub-unit 252C. "AboveRight(SubU2)" indicates the availability of the above-right neighbor of sub-unit 252C. FIG. 14 is a conceptual diagram that illustrates the neighbors of sub-unit 252C.

The neighbor availabilities of sub-unit 252D can be related to those of video unit 250 as follows.

Figure 15:
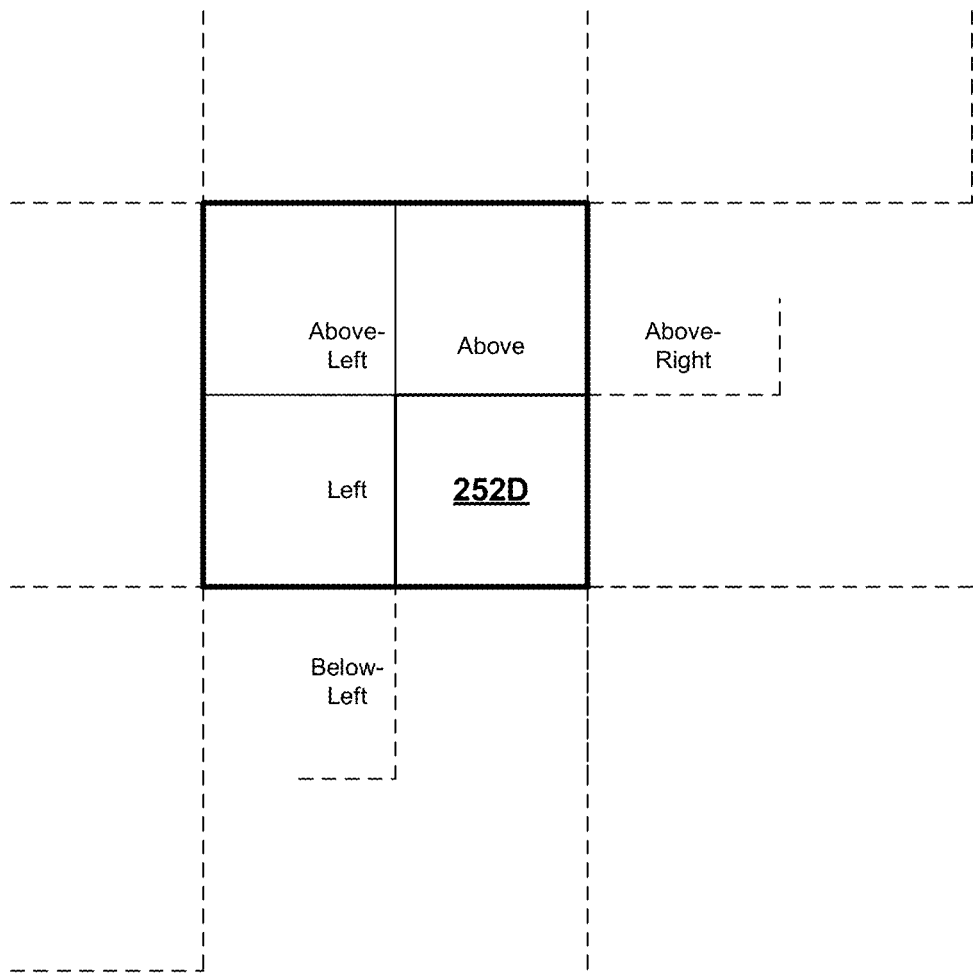
FIG. 15 is a conceptual diagram that illustrates example availabilities of neighbors of a lower-right sub-unit of a non-leaf video unit.

BelowLeft(SubU3)=FALSE
Left(SubU3)=TRUE
AboveLeft(SubU3)=TRUE
Above(SubU3)=TRUE
AboveRight(SubU3)=FALSE "BelowLeft(SubU3) indicates the availability of the below-left neighbor of sub-unit 252D. "Left(SubU3)" indicates the availability of the left neighbor of sub-unit 252D. "AboveLeft(SubU3)" indicates the availability of the above-left neighbor of sub-unit 252D. "Above(SubU3)" indicates the availability of the above neighbor of sub-unit 252D. "AboveRight(SubU3)" indicates the availability of the above-right neighbor of sub-unit 252D. FIG. 15 is a conceptual diagram that illustrates the neighbors of sub-unit 252D.

FIG. 16 is a flowchart that illustrates another example operation 300 to determine the availabilities of neighbors of a current video unit. The current video unit may be a coding unit or a transform unit. The following description explains that a video coder performs operation 300. As described above, a video coder may be a video encoder, such as video encoder 20, or a video decoder, such as video decoder 30.

After operation 300 starts, a video coder may partition the current LCU into one or more base video units (302). The current LCU is the LCU that contains the current video unit. The base video units of the current LCU are equally sized. The base video units have the smallest allowable coding unit or transform unit size. For example, if the current LCU is 8×8 and the smallest allowed coding unit size is 4×4, the video coder may partition the current LCU into four 4×4 base video units.

Next, the video coder identifies a target video unit of the current video unit (304). The video coder may identify the target video unit based on which neighbor of the current video unit is the neighbor of interest. The video coder is attempting to determine the availability of the neighbor of interest. If the video coder is determining the availability of an above neighbor of the current video unit, the video coder identifies a first (i.e., upper left) base video unit of the current video unit as the target video unit. If the video coder is determining the availability of a left neighbor of the current video unit, the video coder identifies the first base video unit of the current video unit as the target video unit. If the video coder is determining the availability of the above-left neighbor of the current video unit, the video coder identifies the first base video unit as the target video unit. If the video coder is determining the availability of the above-right neighbor of the current video unit, the video coder identifies the top right base video unit of the current video unit as the target video unit. If the video coder is determining the availability of the below-left neighbor of the current video unit, the video coder identifies the bottom left base video unit of the current video unit as the target video unit.

Figure 17:
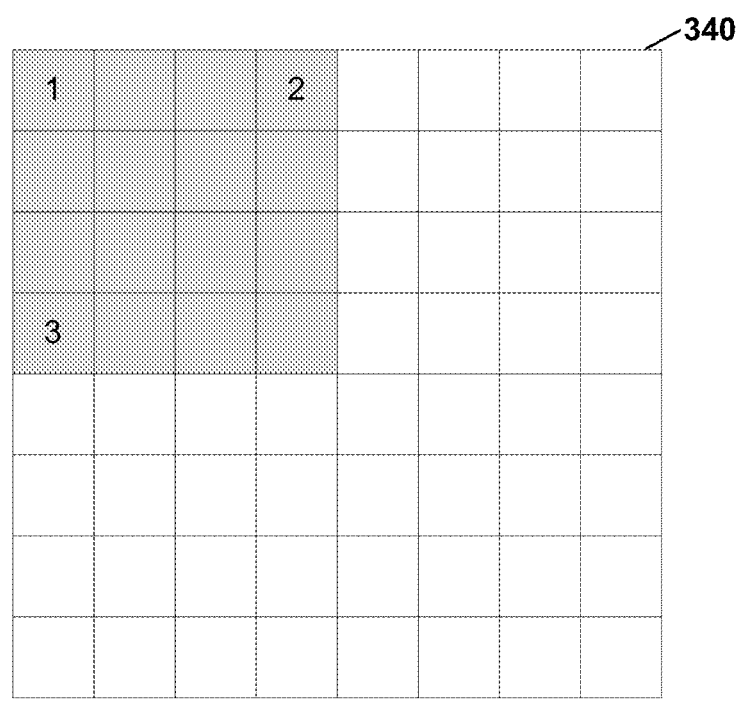
FIG. 17 is a conceptual diagram of an LCU that has been partitioned into sixty-four base video units.

FIG. 17 is a conceptual diagram of an LCU 340 that has been partitioned into sixty-four base video units. In the example of FIG. 17, LCU 340 may be 32×32 and the base video units may be 4×4. The shaded base video units in the top left corner of LCU 340 indicate the base video units in the current video unit. In the example of FIG. 17, the current video unit may be a 16×16 CU or TU. If the neighbor of interest is the above, above-left, or left neighbor of the current video unit, the target video unit is the base video unit labeled "1." If the neighbor of interest is the above-right neighbor of the current video unit, the target video unit is the base video unit labeled "2." If the neighbor of interest is the below-left neighbor of the current video unit, the target video unit is the base video unit labeled "3."

Continuing reference is now made to the example of FIG. 16. After identifying the target video unit, the video coder may determine an index of the target video unit (306). In some examples, the video coder may determine a sequence of the base video units of the LCU according to a raster scan order. The video coder may then determine the index of the target video unit based on the sequencing of the base video units according to the raster scan order. If the target video unit is the first base video unit of the target video unit, the video coder may determine the raster scan index of the target video unit based on the position of the current video unit within the current LCU. For example, in some circumstances, the video coder may determine the raster scan index of the target video unit by multiplying the raster scan index of the current video unit by four. If the target video unit is the top right base video unit of the current video unit, the video coder may determine the raster scan index of the target video unit as follows:

> Index of first base video unit of current video unit+
> (width of current video unit in pixels−1)/width
> of base video units If the target video unit is the bottom left base video unit of the current video unit, the video coder may determine the raster scan index of the target video unit as follows:

> Index of first base video unit of current video unit+
> (LCU width in pixels/base video unit width)*
> (current video unit height in pixels−1)/(base
> video unit width)

If the neighbor of interest is the below-left neighbor of the current video unit ("YES" of 308), the video coder may identify, based on the index of the target video unit, an entry in a LUT for below-left neighbors (310). FIG. 18 is a conceptual diagram that illustrates an example LUT for below-left neighbors. If the neighbor of interest is not the below-left neighbor of the current video unit ("NO" of 308) but the neighbor of interest is the left neighbor of the current video unit ("YES" of 312), the video coder may identify, based on the index of the target video unit, an entry in an LUT for left neighbors (314). FIG. 19 is a conceptual diagram that illustrates an example LUT for left neighbors. If the neighbor of interest is not the left neighbor of the current video unit ("NO" of 312) but the neighbor of interest is the above-left neighbor of the current video unit ("YES" of 316), the video coder may identify, based on the index of the target video unit, an entry in an LUT for above-left neighbors (318). FIG. 20 is a conceptual diagram that illustrates an example LUT for above-left neighbors.

If the neighbor of interest is not the above-left neighbor of the current video unit ("NO" of 316) but the neighbor of interest is the above neighbor of the current video unit ("YES" of 320), the video coder may identify, based on the index of the target video unit, an entry in an LUT for above neighbors (322). FIG. 21 is a conceptual diagram that illustrates an example LUT for above neighbors. If the neighbor of interest is not the above neighbor of the current video unit ("NO" of 320) but the neighbor of interest is the above-right neighbor of the current video unit ("YES" of 324), the video coder may identify, based on the index of the target video unit, an entry in an LUT for above-right neighbors (326). FIG. 22 is a conceptual diagram that illustrates an example LUT for above-right neighbors. After identifying an entry in one of the LUTs, the video coder may use the identified entry to determine the availability of the neighbor of interest (328).

The video coder may identify an entry in the LUTs of FIGS. 18-22 by identifying an entry in the LUTs having a position that corresponds to the position of the target video unit. For example, if the target video unit is at coordinates (4,3) of the current LCU, the video coder may identify the entry at coordinates (4,3) of one of the LUTs.

In FIGS. 18-22, the LCU size is assumed to be 32×32 and the base video unit size is assumed to be 4×4. In examples with differently sized LCUs and/or base video units, video coder may use LUTs different than those shown in FIGS. 18-22. The LCU may only need to be generated once per LCU size. In FIGS. 18-22, each cell corresponds to an entry of the corresponding LUT. If an entry contains the number "1" and the video coder identifies the entry, the neighbor of interest is available. If an entry contains the number "0" and the video coder identifies the entry, the neighbor of interest is not available. If an entry contains the letter "A" and the video coder identifies the entry, the neighbor of interest is available if the neighboring LCU above the current LCU is in the same slice as the current LCU. The current LCU is the LCU that contains the current video unit. If an entry contains the letter "L" and the video coder identifies the entry, the neighbor of interest is available if the neighboring LCU to the left of the current LCU is in the same slice as the current LCU. If an entry contains the letters "AL" and the video coder identifies the entry, the neighbor of interest is available if the neighboring LCU to the above-left of the current LCU is in the same slice as the current LCU. If an entry contains the letters "AR" and the video coder identifies the entry, the neighbor of interest is available if the neighboring LCU to the above-right of the current LCU is in the same slice as the current LCU.

FIG. 23 is a flowchart that illustrates another example operation 350 to determine the availabilities of neighbors of a current video unit. The current video unit may be a coding unit or a transform unit. The following description explains that a video coder performs operation 350. As described above, a video coder may be a video encoder, such as video encoder 20, or a video decoder, such as video decoder 30.

As described elsewhere in this disclosure, a video coder, such as video encoder 20 and video decoder 30, may determine whether neighboring video units are available for various reasons. The video coder may perform operation 350 for any of such reasons. For example, if the video coder is a video encoder, the video coder may perform operation 350 when determining motion information for a PU of a CU. In this example, the video coder may determine the availabilities of neighboring CUs and signal the motion information of the PU based on the motion information of a PU of one of the available neighboring CUs. In another example, if the video coder is a video decoder, the video coder may perform operation 350 when performing an intra prediction operation for a CU. In this example, the video coder may determine the availabilities of neighboring CUs and use default or synthesized pixel values if an intra prediction mode of the CU entails the use of pixel values of an unavailable CU.

After a video coder starts operation 350, the video coder may partition the current LCU into one or more base video units (352). The video coder may then identify a target video unit of the current video unit (354). The video coder may partition the current LCU and identify the target video unit in the manner described above with regard to FIG. 16.

After identifying the target video unit, the video coder may determine an index of the target video unit (356). In some examples, the video coder may determine a raster scan index of the target video unit as described above with regard to FIG. 16. In other examples, the video coder may determine a z-scan index of the target video unit.

After identifying the index of the target video unit, the video coder identifies, based on the index of the target video unit, an entry in an LUT (358). The LUT may include a column for raster scan indexes of base video units, a column for z-scan indexes of base video units, a column for the availability of base video units' below-left neighbors, a column for the availabilities of base video units' left neighbors, a column for the availabilities of base video units' above-left neighbors, a column for the availabilities of base video units' above neighbors, and a column for the availabilities of base video units' above-right neighbors.

Table 2 illustrates an example LUT.

TABLE 2

| Raster scan Index | Z scan Index | Below-Left Neighbor | Left Neighbor | Above-Left Neighbor | Above Neighbor | Above-Right Neighbor |
|---|---|---|---|---|---|---|
| 0 | 0 | bLeftLCU | bLeftLCU | bAboveLeftLCU | bAboveLCU | bAboveLCU |
| 1 | 1 | False | True | bAboveLCU | bAboveLCU | bAboveLCU |
| 2 | 4 | True | True | bAboveLCU | bAboveLCU | bAboveLCU |
| 3 | 5 | False | True | bAboveLCU | bAboveLCU | bAboveLCU |
| 4 | 16 | True | True | bAboveLCU | bAboveLCU | bAboveLCU |
| 5 | 17 | False | True | bAboveLCU | bAboveLCU | bAboveLCU |
| 6 | 20 | True | True | bAboveLCU | bAboveLCU | bAboveLCU |
| 7 | 21 | False | True | bAboveLCU | bAboveLCU | bAboveRightLCU |
| 8 | 2 | bLeftLCU | bLeftLCU | bLeftLCU | True | True |
| 9 | 3 | False | True | True | True | False |
| 10 | 6 | False | True | True | True | True |
| 11 | 7 | False | True | True | True | False |
| 12 | 18 | True | True | True | True | True |
| 13 | 19 | False | True | True | True | False |
| 14 | 22 | False | True | True | True | True |
| 15 | 23 | False | True | True | True | False |
| 16 | 8 | Left_Lcu | bLeftLCU | bLeftLCU | True | True |
| 17 | 9 | False | True | True | True | True |
| 18 | 12 | True | True | True | True | True |
| 19 | 13 | False | True | True | True | False |
| 20 | 24 | True | True | True | True | True |
| 21 | 25 | False | True | True | True | True |
| 22 | 28 | True | True | True | True | True |
| 23 | 29 | False | True | True | True | False |
| 24 | 10 | bLeftLCU | bLeftLCU | bLeftLCU | True | True |
| 25 | 11 | False | True | True | True | False |
| 26 | 14 | False | True | True | True | True |
| 27 | 15 | False | True | True | True | False |
| 28 | 26 | False | True | True | True | True |
| 29 | 27 | False | True | True | True | False |
| 30 | 30 | False | True | True | True | True |
| 31 | 31 | False | True | True | True | False |
| 32 | 32 | bLeftLCU | bLeftLCU | bLeftLCU | True | True |
| 33 | 33 | False | True | True | True | True |
| 34 | 36 | True | True | True | True | True |
| 35 | 37 | False | True | True | True | True |
| 36 | 48 | True | True | True | True | True |
| 37 | 49 | False | True | True | True | True |
| 38 | 52 | True | True | True | True | True |
| 39 | 53 | False | True | True | True | False |
| 40 | 34 | bLeftLCU | bLeftLCU | bLeftLCU | True | True |
| 41 | 35 | False | True | True | True | False |
| 42 | 38 | False | True | True | True | True |
| 43 | 39 | False | True | True | True | False |
| 44 | 50 | True | True | True | True | True |
| 45 | 51 | False | True | True | True | False |
| 46 | 54 | False | True | True | True | True |
| 47 | 55 | False | True | True | True | False |
| 48 | 40 | bLeftLCU | bLeftLCU | bLeftLCU | True | True |
| 49 | 41 | False | True | True | True | True |
| 50 | 44 | True | True | True | True | True |
| 51 | 45 | False | True | True | True | False |
| 52 | 56 | True | True | True | True | True |
| 53 | 57 | False | True | True | True | True |
| 54 | 60 | True | True | True | True | True |
| 55 | 61 | False | True | True | True | False |
| 56 | 42 | False | bLeftLCU | bLeftLCU | True | True |
| 57 | 43 | False | True | True | True | False |
| 58 | 46 | False | True | True | True | True |
| 59 | 47 | False | True | True | True | False |

TABLE 2-continued

| Raster scan Index | Z scan Index | Below-Left Neighbor | Left Neighbor | Above-Left Neighbor | Above Neighbor | Above-Right Neighbor |
|---|---|---|---|---|---|---|
| 60 | 58 | False | True | True | True | True |
| 61 | 59 | False | True | True | True | False |
| 62 | 62 | False | True | True | True | True |
| 63 | 63 | False | True | True | True | False |

The video coder may store different LUTs for differently sized LCUs and base video units. For example, the video coder may use the example LUT of Table 2 when the LCUs are 32×32 and the base video units are 4×4. In other examples, the video coder may use a different LUT when the LCUs are 64×64 and the base video units are 4×4. In yet another example, the video coder may use yet another LUT when the LCUs are 32×32 and the base video units are 8×8.

In the example LUT of Table 2, the value "bAboveLCU" evaluates to "true" if there is an LCU above the current LCU in the same slice as the current LCU, and "false" otherwise. The value "bAboveLeftLCU" evaluates to "true" if there is an LCU to the above-left of the current LCU in the same slice as the current LCU, and "false" otherwise. The value "bAboveRightLCU" evaluates to "true" if there is an LCU to the above-right of the current LCU in the same slice as the current LCU, and "false" otherwise. The value "bLeftLCU" evaluates to "true" if there is an LCU to the left of the current LCU in the same slice as the current LCU, and "false" otherwise. The video coder may determine whether a neighboring LCU is in the same slice as the current LCU based on the horizontal and vertical indices of the neighboring LCU and the current LCU.

In the example of FIG. 23, if the identified entry indicates that the neighbor of interest is available ("YES" of 360), the video coder may determine that the neighbor of interest is available (362). If the identified entry does not indicate that the neighbor of interest is available ("NO" of 360), the video coder may determine whether the identified entry instructs the video coder to check the left LCU (364). For instance, the video coder may determine whether the identified entry indicates "bLeftLCU" for the neighbor of interest. If the identified entry instructs the video coder to check the left LCU ("YES" of 364), the video coder may determine whether the LCU that neighbors the current LCU to the left is within the same slice as the current LCU (366). If the LCU that neighbors the current LCU to the left is within the same slice as the current LCU ("YES" of 366), the video coder determines that the neighbor of interest is available (368). Otherwise, if the LCU that neighbors the current LCU to the left is not within the same slice as the current LCU ("NO" of 366), the video coder may determine that the neighbor of interest is not available (370).

If the identified entry does not instruct the video coder to check the left LCU ("NO" of 364), the video coder may determine whether the identified entry instructs the video coder to check the above-left LCU (372). For instance, the video coder may determine whether the identified entry indicates "bAboveLeftLCU" for the neighbor of interest. If the identified entry instructs the video coder to check the above-left LCU ("YES" of 372), the video coder may determine whether the LCU to the above-left of the current LCU is within the same slice as the current LCU (374). If the LCU to the above-left of the current LCU is within the same slice as the current LCU ("YES" of 374), the video coder may determine that the neighbor of interest is available (376). Otherwise, if the LCU to the above-left of the current LCU is not within the same slice as the current LCU ("NO" of 374), the video coder may determine that the neighbor of interest is not available (370).

If the identified entry does not instruct the video coder to check the above-left LCU ("NO" of 372), the video coder may determine whether the identified entry instructs the video coder to check the above-right LCU (378). For instance, the video coder may determine whether the identified entry indicates "bAboveRightLCU" for the neighbor of interest. If the identified entry instructs the video coder to check the above-right LCU ("YES" of 378), the video coder may determine whether the LCU to the above-right of the current LCU is within the same slice as the current LCU (380). If the LCU to the above-right of the current LCU is within the same slice as the current LCU ("YES" of 380), the video coder may determine that the neighbor of interest is available (382). Otherwise, if the identified entry does not instruct the video coder to check the above-right LCU ("NO" of 378) or the LCU to the above-right of the current LCU is not within the same slice as the current LCU ("NO" of 380), the video coder may determine that the neighbor of interest is not available (370).

In some instances, the example operations illustrated in FIGS. 16 and 23 may be optimized implementations of the following logic. If the neighbor of interest is the above neighbor of a target video unit and if the target video unit is on the top row of the current LCU, the neighbor of interest is available if the neighboring LCU above the current LCU is within the same slice as the current LCU. The neighbor of interest is not available if the neighboring LCU above the current LCU is not within the same slice as the current LCU. The neighbor of interest is available if the target video unit is not on top row of the current LCU.

If the neighbor of interest is the left neighbor of the target video unit and the target video unit is on the left column of the current LCU, the neighbor of interest is available if the neighboring LCU to left of the current LCU is within the same slice as the current LCU. The neighbor of interest is not available if the neighboring LCU to the left of the current LCU is not within the same slice as the current LCU. The neighbor of interest is available if the target video unit is not in the left column of the current LCU.

If the neighbor of interest is the above-left neighbor of the target video unit, the target video unit includes the top left pixel of the current LCU, and the LCU to the above-left of the current LCU is within the same slice as the current LCU, the neighbor of interest is available. Otherwise, if the LCU to the above-left of the current LCU is not within the same slice as the current LCU, the neighbor of interest is not available. If the target video unit is on the top row of the current LCU (but not the top left video unit of the LCU), the neighbor of interest is available if the LCU above the current LCU is within the same slice as the current LCU. If the target video unit is on the top row of the current LCU, the neighbor of interest is not available if the LCU above the current LCU is not within the same slice as the current LCU. If the neighbor of interest is in the left column of the current LCU (but not the top left), the neighbor of interest is available if the LCU to the left of the current LCU is within the same slice as the current LCU. If the neighbor of interest is in the left column of the current LCU (but not the top left), the neighbor of interest is not available if the LCU to the left of the current LCU is not within the same slice as the current LCU. Otherwise, the neighbor of interest is available.

If the neighbor of interest is the below-left neighbor of the target video unit and the target video unit includes the bottom-left pixel of the current LCU, the neighbor of interest is not available. If the target video unit is on the bottom row of the current LCU, but not does not include the bottom-left pixel of the current LCU, the neighbor of interest is not available. If the target video unit is on the left column of the current LCU (but not at the bottom left), the neighbor of interest is available if the LCU to the left of the current LCU is within the same slice as the current LCU. If the target video unit is on the left column of the current LCU (but not at the bottom left), the neighbor of interest is not available if the LCU to the left of the current LCU is not within the same slice as the current LCU. As described above, the video coder may code the video units within the current LCU according to a z-scan order. Thus, the video coder may code video units having higher z-scan indexes after coding video units having lower z-scan indexes. Accordingly, if the target video unit is not on the bottom row or the left column of the current LCU, the neighbor of interest is available if the z-scan index of the neighbor of interest is less than the z-scan index of the target video unit. The neighbor of interest is not available if the z-scan index of the neighbor of interest is not less (i.e., greater) than the z-scan index of the target video unit.

If the neighbor of interest is the above-right neighbor of the target video unit and the target video unit is in the top right corner of the current LCU, the neighbor of interest is available if the LCU to the above right of the current LCU is within the same slice as the current LCU. The neighbor of interest is not available if the LCU to the above right of the current LCU is not within the same slice as the current LCU. If the target video unit is in the top row of the current LCU (but is not the top right base video unit of the current LCU), the neighbor of interest is available if the LCU above the current LCU is within the same slice as the current LCU. If the target video unit is in the top row of the current LCU (but is not the top right base video unit of the current LCU), the neighbor of interest is not available if the LCU above the current LCU is not within the same slice as the current LCU. The neighbor of interest is not available if the target video unit is in the right column of the current LCU (but not the top right base video unit of the current LCU). Otherwise, if the target video unit is not in the top row or the right column, the neighbor of interest is available if the z-scan index of the neighbor of interest is less than the z-scan index of the target video unit. The neighbor of interest is not available if the z-scan index of the neighbor of interest is not less than the z-scan index of the target video unit.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method for coding video data, the method comprising:
   identifying, based on availabilities of video units that neighbor a grandparent video unit of a current video unit, a first entry in a lookup table, the video units that neighbor the grandparent video unit including a below-left neighbor of the grandparent video unit, a left neighbor of the grandparent video unit, an above-left neighbor of the grandparent video unit, an above neighbor of the grandparent video unit, and an above-right neighbor of the grandparent video unit, the current video unit being within a picture of the video data, the identified first entry indicating availabilities of a plurality of video units that neighbor a parent video unit of the current video unit, the plurality of video units that neighbor the parent video unit including a below-left neighbor of the parent video unit, a left neighbor of the parent video unit, an above-left neighbor of the parent video unit, an above neighbor of the parent video unit, and an above-right neighbor of the parent video unit, wherein the grandparent video unit is a parent video unit of the parent video unit of the current video unit, and the parent video unit of the current video unit is not a tree block;

identifying, based on the availabilities of the video units that neighbor the parent video unit, a second, different entry in the lookup table, the second entry indicating availabilities of a plurality of video units that neighbor the current video unit, the plurality of video units that neighbor the current video unit including a below-left neighbor of the current video unit, a left neighbor of the current video unit, an above-left neighbor of the current video unit, an above neighbor of the current video unit, and an above-right neighbor of the current video unit; and performing a coding operation on the current video unit using data associated with a video unit that neighbors the current video unit based on determining the video unit that neighbors the current video unit is available.

2. The method of claim 1, wherein performing the coding operation on the current video unit comprises:

selecting, based on the data associated with the video unit that neighbors the current video unit, a context model; and performing, based on the selected context model, an entropy coding operation on data associated with the current video unit.

3. The method of claim 1, wherein the current video unit is a coding unit or a transform unit.

4. The method of claim 1, further comprising:

determining whether the current video unit is a tree block; and based on the current video unit not being a tree block, determining the availabilities of the plurality of the video units that neighbor the parent video unit of the current video unit.

5. The method of claim 4, wherein determining the availabilities of the plurality of video units that neighbor the parent video unit of the current video unit comprises recursively performing operations to determine the availabilities of video units that neighbor ancestor video units of the current video unit.

6. The method of claim 4, wherein determining the availabilities of the plurality of the video units that neighbor the parent video unit of the current video unit comprises performing a non-recursive operation to determine the availabilities of video units that neighbor ancestor video units of the current video unit.

7. The method of claim 1, further comprising:

based on the grandparent video unit being a tree block, determining the availabilities of the video units that neighbor the grandparent video unit based on a position of the grandparent video unit within the picture.

8. The method of claim 1, wherein the identified second entry comprises a series of values, each respective value of the series of values indicating a respective availability of a respective video unit that neighbors the current video unit.

9. The method of claim 1, wherein the lookup table includes entries for multiple combinations of availabilities of the plurality of video units that neighbor the parent video unit of the current video unit.

10. The method of claim 9, wherein the lookup table includes entries for other child video units of the parent video unit of the current video unit, the entries for the other child video units indicating availabilities of video units that neighbor the other child video units.

11. The method of claim 1, wherein the coding operation is part of an encoding operation.

12. The method of claim 11, wherein performing the coding operation on the current video unit comprises generating prediction data for the current video unit based on one or more pixel values of the video unit that neighbors the current video unit; and wherein the method further comprises:

generating, based on the prediction data for the current video unit, residual data for the current video unit;

applying one or more transforms to the residual data to generate one or more transform coefficient blocks; and outputting a bitstream that contains encoded data that represent the one or more transform coefficient blocks.

13. The method of claim 1, wherein the coding operation is part of a decoding operation.

14. The method of claim 13, wherein performing the coding operation on the current video unit comprises generating prediction data for the current video unit based on one or more pixel values of the video unit that neighbors the current video unit; and wherein the method further comprises:

decoding residual data for the current video unit;

reconstructing pixel values for the current video unit based on the prediction data for the current video unit and the residual data for the current video unit; and outputting the picture, the picture including the pixel values for the current video unit.

15. The method of claim 1, further comprising performing the method on a wireless communication device, wherein the wireless communication device comprises:

a memory configured to store the video data; and a processor configured to execute instructions to process the video data stored in said memory; and wherein at least one of:

the coding operation is an encoding operation that encodes the current video unit and the device comprises a transmitter configured to transmit encoded video data including an encoded representation of a picture that contains the current video unit; or the coding operation is a decoding operation and the device comprises a receiver configured to receive the encoded video data that includes the encoded representation of the picture that contains the current video unit.

16. The method of claim 15, wherein the wireless communication device is a cellular telephone and the encoded video data is transmitted by the transmitter or received by the receiver and modulated according to a wireless communication protocol.

17. A video coding apparatus comprising:

one or more data storage media configured to store video data; and one or more processors configured to:

identify, based on availabilities of video units that neighbor a grandparent video unit of a current video unit of the video data, a first entry in a lookup table, the video units that neighbor the grandparent video unit including a below-left neighbor of the grandparent video unit, a left neighbor of the grandparent video unit, an above-left neighbor of the grandparent video unit, an above neighbor of the grandparent video unit, and an above-right neighbor of the grandparent video unit, the current video unit being within a picture, the identified first entry indicating availabilities of a plurality of video units that neighbor a parent video unit of the current video unit, the plurality of video units that neighbor the parent video unit including a below-left neighbor of the parent video unit, a left neighbor of the parent video unit, an above-left neighbor of the parent video unit, an above neighbor of the parent video unit, and an above-right neighbor of the parent video unit, wherein the grandparent video unit is a parent video unit of the parent video unit of the current video unit, and the parent video unit of the current video unit is not a tree block;

identify, based on the availabilities of the plurality of video units that neighbor the parent video unit, a second, different entry in the lookup table, the second entry indicating availabilities of a plurality of video units that neighbor the current video unit, the plurality of video units that neighbor the current video unit including a below-left neighbor of the current video unit, a left neighbor of the current video unit, an above-left neighbor of the current video unit, an above neighbor of the current video unit, and an above-right neighbor of the current video unit; and perform a coding operation on the current video unit using data associated with a video unit that neighbors the current video unit based on determining the video unit that neighbors the current video unit is available.

18. The video coding apparatus of claim 17, wherein the one or more processors are configured to:
select, based on the data associated with the video unit that neighbors the current video unit, a context model; and
perform, based on the selected context model, an entropy coding operation on data associated with the current video unit.

19. The video coding apparatus of claim 17, wherein the current video unit is a coding unit or a transform unit.

20. The video coding apparatus of claim 17, wherein the one or more processors are configured to:
determine whether the current video unit is a tree block; and
based on the current video unit not being a tree block, determine the availabilities of the plurality of video units that neighbor the parent video unit of the current video unit.

21. The video coding apparatus of claim 20, wherein the one or more processors are configured to recursively perform operations to determine the availabilities of video units that neighbor ancestor video units of the current video unit.

22. The video coding apparatus of claim 20, wherein the one or more processors are configured to perform a non-recursive operation to determine the availabilities of video units that neighbor ancestor video units of the current video unit.

23. The video coding apparatus of claim 17, wherein the one or more processors are configured to:
based on the grandparent video unit being a tree block, determine the availabilities of the video units that neighbors the grandparent video unit based on a position of the grandparent video unit within the picture.

24. The video coding apparatus of claim 17, wherein the identified second entry comprises a series of values, each respective value of the series of values indicating a respective availability of a respective video unit that neighbors the current video unit.

25. The video coding apparatus of claim 17, wherein the lookup table includes entries for multiple combinations of the availabilities of the plurality of video units that neighbor the parent video unit of the current video unit.

26. The video coding apparatus of claim 25, wherein the lookup table includes entries for other child video units of the parent video unit of the current video unit, the entries for the other child video units indicating availabilities of video units that neighbor the other child video units.

27. The video coding apparatus of claim 17, wherein the coding operation is part of an encoding operation.

28. The video coding apparatus of claim 27, wherein the one or more processors are configured to:
generate prediction data for the current video unit based on one or more pixel values of the video unit that neighbors the current video unit;
generate residual data for the current video unit based on the prediction data for the current video unit;
apply one or more transforms to the residual data to generate one or more transform coefficient blocks; and
output a bitstream that contains encoded data that represent the one or more transform coefficient blocks.

29. The video coding apparatus of claim 17, wherein the coding operation is part of a decoding operation.

30. The video coding apparatus of claim 29, wherein the one or more processors are configured to:
generate prediction data for the current video unit based on one or more pixel values of the video unit that neighbors the current video unit;
decode residual data for the current video unit;
reconstruct pixel values for the current video unit based on the prediction data for the current video unit and the residual data for the current video unit; and
output the picture, the picture including the pixel values for the current video unit.

31. The video coding apparatus of claim 17, wherein the video coding apparatus is a wireless communication device, and at least one of:
the coding operation is an encoding operation that encodes the current video unit and the video coding apparatus further comprises a transmitter configured to transmit encoded video data including an encoded representation of a picture that contains the current video unit; or
the coding operation is a decoding operation and the video coding apparatus further comprises a receiver configured to receive the encoded video data that includes the encoded representation of the picture that contains the current video unit.

32. The apparatus of claim 31, wherein the wireless communication device is a cellular telephone and the encoded video data is transmitted by the transmitter or received by the receiver and modulated according to a wireless communication protocol.

33. A video coding apparatus for coding video data, the video coding apparatus comprising:
means for identifying, based on availabilities of video units that neighbor a grandparent video unit of a current video unit, a first entry in a lookup table, the current video unit being within a picture of the video data, the video units that neighbor the grandparent video unit including a below-left neighbor of the grandparent video unit, a left neighbor of the grandparent video unit, an above-left neighbor of the grandparent video unit, an above neighbor of the grandparent video unit, and an above-right neighbor of the grandparent video unit, the identified first entry indicating availabilities of a plurality of video units that neighbor a parent video unit of the current video unit, the plurality of video units that neighbor the parent video unit including a below-left neighbor of the parent video unit, a left neighbor of the parent video unit, an above-left neighbor of the parent video unit, an above neighbor of the parent video unit, and an above-right neighbor of the parent video unit, wherein the grandparent video unit is a parent video unit of the parent video unit of the current video unit, and the parent video unit of the current video unit is not a tree block;

means for identifying, based on the availabilities of the video units that neighbor the parent video unit, a second, different entry in the lookup table, the second entry indicating availabilities of a plurality of video units that neighbor the current video unit, the plurality of video units that neighbor the current video unit including a below-left neighbor of the current video unit, a left neighbor of the current video unit, an above-left neighbor of the current video unit, an above neighbor of the current video unit, and an above-right neighbor of the current video unit; and means for performing a coding operation on the current video unit using data associated with a video unit that neighbors the current video unit based on determining the video unit that neighbors the current video unit is available.

34. The video coding apparatus of claim 33 further comprising:

means for determining whether the current video unit is a tree block; and means for recursively performing operations to determine the availabilities of video units that neighbor ancestor video units of the current video unit based on the current video unit not being a tree block.

35. The video coding apparatus of claim 33, wherein the identified second entry comprises a series of values, each respective value of the series of values indicating a respective availability of a respective video unit that neighbors the current video unit.

36. The video coding apparatus of claim 33, wherein the coding operation is part of an encoding operation.

37. The video coding apparatus of claim 33, wherein the coding operation is part of a decoding operation.

38. A non-transitory computer-readable medium having stored thereon instructions that, when executed, cause one or more processors to:

identify, based on availabilities of video units that neighbor a grandparent video unit of a current video unit, a first entry in a lookup table, the video units that neighbor the grandparent video unit including a below-left neighbor of the grandparent video unit, a left neighbor of the grandparent video unit, an above-left neighbor of the grandparent video unit, an above neighbor of the grandparent video unit, and an above-right neighbor of the grandparent video unit, the current video unit being within a picture, the identified first entry indicating availabilities of a plurality of video units that neighbor a parent video unit of the current video unit, the plurality of video units that neighbor the parent video unit including a below-left neighbor of the parent video unit, a left neighbor of the parent video unit, an above-left neighbor of the parent video unit, an above neighbor of the parent video unit, and an above-right neighbor of the parent video unit, wherein the grandparent video unit is a parent video unit of the parent video unit of the current video unit, and the parent video unit of the current video unit is not a tree block, and identify, based on the availabilities of the video units that neighbor the parent video unit, a second, different entry in the lookup table, the second entry indicating availabilities of a plurality of video units that neighbor the current video unit, the plurality of video units that neighbor the current video unit including a below-left neighbor of the current video unit, a left neighbor of the current video unit, an above-left neighbor of the current video unit, an above neighbor of the current video unit, and an above-right neighbor of the current video unit; and perform a coding operation on the current video unit using data associated with a video unit that neighbors the current video unit based on determining the video unit that neighbors the current video unit is available.

39. The non-transitory computer-readable medium of claim 38, wherein the instructions cause the one or more processors to:

determine whether the current video unit is a tree block; and recursively perform operations to determine availabilities of video units that neighbor ancestor video units of the current video unit based on the current video unit not being a tree block.

40. The non-transitory computer-readable medium of claim 38, wherein the identified second entry comprises a series of values, each respective value of the series of values indicating a respective availability of a respective video unit that neighbors the current video unit.

41. The non-transitory computer-readable medium of claim 38, wherein the coding operation is part of an encoding operation.

42. The non-transitory computer-readable medium of claim 38, wherein the coding operation is part of a decoding operation.

* * * * *